(12) United States Patent
Schick et al.

(10) Patent No.: US 12,315,198 B2
(45) Date of Patent: May 27, 2025

(54) METHOD FOR CAPTURING THREE-DIMENSIONAL IMAGES WITH THE AID OF A STEREO CAMERA HAVING TWO CAMERAS, AS WELL AS METHOD FOR PRODUCING A REDUNDANT IMAGE OF A MEASUREMENT OBJECT, AND APPARATUS FOR CARRYING OUT THE METHODS

(71) Applicant: Tripleye GmbH, Karlsruhe (DE)

(72) Inventors: Jens Schick, Herrenberg (DE); Michael Scharrer, Karlsruhe (DE)

(73) Assignee: Tripleye GmbH, Karlsruhe (DE)

( * ) Notice: Subject to any disclaimer, the term of this patent is extended or adjusted under 35 U.S.C. 154(b) by 40 days.

(21) Appl. No.: 18/027,706

(22) PCT Filed: Sep. 28, 2021

(86) PCT No.: PCT/EP2021/076559
§ 371 (c)(1),
(2) Date: Mar. 22, 2023

(87) PCT Pub. No.: WO2022/069424
PCT Pub. Date: Apr. 7, 2022

(65) Prior Publication Data
US 2023/0377196 A1 Nov. 23, 2023

(30) Foreign Application Priority Data
Sep. 29, 2020 (DE) ...................... 10 2020 212 285.7

(51) Int. Cl.
*G06T 7/80* (2017.01)
*G06T 7/593* (2017.01)
(Continued)

(52) U.S. Cl.
CPC ............... *G06T 7/80* (2017.01); *G06T 7/593* (2017.01); *H04N 13/128* (2018.05);
(Continued)

(58) Field of Classification Search
None
See application file for complete search history.

(56) References Cited

U.S. PATENT DOCUMENTS

| 5,432,712 A | 7/1995 | Chan |
| 6,671,399 B1 | 12/2003 | Berestov |

(Continued)

FOREIGN PATENT DOCUMENTS

| WO | 2013020872 A1 | 2/2013 |
| WO | 2018037947 A1 | 3/2018 |

OTHER PUBLICATIONS

Efron, Bradley, and Carl Morris. "Stein's estimation rule and its competitors-an empirical Bayes approach." Journal of the American Statistical Association 68, No. 341 (1973): 117-130.

(Continued)

*Primary Examiner* — Samuel D Fereja
(74) *Attorney, Agent, or Firm* — Smartpat PLC

(57) ABSTRACT

For three-dimensional image capture with the aid of a stereo camera having two cameras, an image of a three-dimensional scene is first captured simultaneously with the two cameras. Characteristic signatures of scene objects within each captured image are determined and assigned to each other in pairs. Characteristic position deviations of the assigned signature pairs from each other are determined. The position deviations are filtered in order to select assigned signature pairs. Based on the selected signature pairs, a triangulation calculation is performed to determine depth data for the respective scene objects. A 3D data map of the captured scene objects within the captured image of the three-dimensional scene is then created. This results in a method for capturing three-dimensional images, which is well adapted for practical use, in particular, for capturing images to safeguard autonomous driving.

6 Claims, 12 Drawing Sheets

(51) Int. Cl.
  *H04N 13/128* (2018.01)
  *H04N 13/243* (2018.01)
  *H04N 23/90* (2023.01)
  *H04N 13/00* (2018.01)

(52) U.S. Cl.
  CPC ........... *H04N 13/243* (2018.05); *H04N 23/90* (2023.01); *G06T 2207/10012* (2013.01); *G06T 2207/30252* (2013.01); *H04N 2013/0081* (2013.01)

(56) References Cited

U.S. PATENT DOCUMENTS

| | | | | |
|---|---|---|---|---|
| 11,659,154 | B1* | 5/2023 | Pighi | H04N 13/111 348/46 |
| 2011/0316980 | A1 | 12/2011 | Dubbelman et al. | |
| 2016/0048970 | A1 | 2/2016 | Loghman et al. | |
| 2018/0027224 | A1* | 1/2018 | Javidnia | G06T 7/593 382/154 |
| 2018/0061079 | A1 | 3/2018 | Torii | |
| 2018/0367681 | A1 | 12/2018 | Xu et al. | |
| 2019/0158813 | A1 | 5/2019 | Rowell et al. | |
| 2019/0364206 | A1* | 11/2019 | Dal Mutto | G06T 7/80 |
| 2023/0351625 | A1* | 11/2023 | Hughes | G06T 7/593 |

OTHER PUBLICATIONS

Kendall, Alex, Hayk Martirosyan, Saumitro Dasgupta, Peter Henry, Ryan Kennedy, Abraham Bachrach, and Adam Bry. "End-to-end learning of geometry and context for deep stereo regression." In Proceedings of the IEEE international conference on computer vision, pp. 66-75. 2017.

Medioni, Gérard, and Ramakant Nevatia. "Segment-based stereo matching." Computer vision, graphics, and image processing 31, No. 1 (1985): 2-18.

Nagano, Maki, Kosuke Sato, and Kunihiro Chihara. "Shape integration of multi stereo images using surveyed points for an archaeological site." In Proceedings of 1997 International Conference on Shape Modeling and Applications, pp. 140-148. IEEE, 1997.

Scharstein, Daniel, and Richard Szeliski. "A taxonomy and evaluation of dense two-frame stereo correspondence algorithms." International journal of computer vision 47 (2002): 7-42.

* cited by examiner

METHOD FOR CAPTURING THREE-DIMENSIONAL IMAGES WITH THE AID OF A STEREO CAMERA HAVING TWO CAMERAS, AS WELL AS METHOD FOR PRODUCING A REDUNDANT IMAGE OF A MEASUREMENT OBJECT, AND APPARATUS FOR CARRYING OUT THE METHODS

CROSS-REFERENCES TO RELATED APPLICATIONS

This application claims the priority of German Patent Application, Serial No. DE 10 2020 212 285.7, filed Sep. 29, 2020, the content of which is incorporated herein by reference in its entirety as if fully set forth herein.

FIELD OF THE INVENTION

The invention relates to a method for capturing three-dimensional images with the aid of a stereo camera having two cameras. Furthermore, the invention relates to a method for producing a redundant image of a measurement object and to an apparatus for carrying out these methods.

BACKGROUND OF THE INVENTION

An object detection apparatus is known from WO 2013/020872 A1 and the references given therein.

SUMMARY OF THE INVENTION

It is an object of the present invention to provide a method for capturing three-dimensional images which is well adapted for practical use, in particular for capturing images to safeguard autonomous driving.

This object is achieved according to the invention by a method for capturing three-dimensional images with the aid of a stereo camera having two cameras, comprising the steps of capturing an image of a three-dimensional scene simultaneously with the two cameras of the stereo camera, determining characteristic signatures of scene objects within each captured image, assigning the signatures of the captured images in pairs to each other, determining characteristic position deviations of the assigned signature pairs from one another, filtering the position deviations to select assigned signature pairs, triangulation calculation to determine depth data for the respective scene objects on the basis of the selected signature pairs and creating a 3D data map of the captured scene objects within the captured image of the three-dimensional scene.

Position deviations between signatures of scene objects, which result from position deviations of the cameras from each other, can be precisely detected and compensated for with this method.

Scene objects can be objects of comparatively small extent whose images are, for example, only single or less than ten pixels in size of the respective camera. Alternatively, the scene objects can also have a larger extent and encompass entire image areas. Examples of such larger scene objects are, in the example of a vehicle image capture, individual vehicle components or vehicle sections or even the entire vehicle.

Examples of characteristic position deviations that are determined in the image capture method are a deviation or a distance of an imaging position of the image of scene objects from an epipolar line of the respective camera. A position deviation of the respective imaging position of a scene object along the epipolar line can also be considered in the determination method. These position deviations are also referred to in the following as vertical disparity and horizontal disparity.

When filtering the position deviations, it can simply be checked whether the position deviations are smaller than a specified position deviation tolerance value. The specification of the position deviation tolerance value is fluid and can take place until the number of selected signature pairs is smaller than the specified limit value.

Instead of one stereo camera, more than two cameras can work together in the image capture method.

Each of the cameras can in turn be constructed as a system of several cameras that are assigned to each other. One of these mutually assigned cameras may be a fisheye camera. The focal length of such a fisheye camera may be less than 20 mm. Another of these assigned cameras may be a telephoto camera comprising a telephoto lens having a focal length of at least 80 mm.

To determine the characteristic position deviations of the assigned signature pairs from each other and to filter the position deviations, for example, each of the vertical disparities can be summed up square for all signature pairs and state variables of the stereo camera can be varied until this sum of squares is minimized.

A position deviation tolerance value in the form of a default sum of squares of the vertical disparity or also a standard deviation of the vertical disparity can be used as a termination criterion for pushing the number of selected signature pairs below a specified limit value.

In particular, relative movements between the cameras can be taken into account in the image capture method. An estimation of the relative position of the cameras to each other can be performed asynchronously to the triangulation calculation by determining the characteristic position deviations of assigned signature pairs.

A position correction of a relative position of the cameras to each other, in particular on the basis of a relative position estimation, can also be carried out immediately before each triangulation calculation. A camera position calibration can then be available for each measurement process.

With such an immediate calibration, reliable stereo measurements can be carried out even when using image capture apparatuses in which the relative position of the cameras to each other is constantly changing. Such a position correction that is based in particular on a camera relative position estimation can be carried out using data from inertial measuring units to which the cameras are permanently connected. In particular, the use of camera measuring apparatuses having a very large distance between the cameras (long baseline stereoscopy) is possible.

Known rectification methods can be used for the triangulation calculation. In this context, reference is made to the specialist publications by Karl Kraus, Photogrammetrie (=Photogrammetry), Volumes 1 and 2, Dümmler, Bonn, 1996/1997 and Thomas Luhmann, Nahbereichsphotogrammetrie Grundlagen, Methoden and Anwendungen (=Basics, methods and applications of close-range photogrammetry), 3rd edition, Berlin/Offenbach 2010.

In triangulation calculation, an optical distance measurement is carried out by measuring angles within triangles that are defined within the scope of the method. These can be formed by one of the two cameras and two image points or by the two cameras and one image point.

When filtering the distance deviations to select assigned signature pairs, those signature pairs can be selected that are more likely to belong to the same scene object of the three-dimensional scene.

The filtering of the position deviations to select assigned signature pairs may be performed to select the assigned signature pairs that belong to the same scene object of the three-dimensional scene using a filtering algorithm. A measure of the respective positional disparity that can be used for filtering is, for example, the horizontal disparity and/or the vertical disparity.

In the image capture method in which, as long as the number of selected signature pairs is greater than a predetermined limit value, the steps of determining angular correction values between the different selected assigned signature pairs to check whether mapped raw objects that belong to the different selected assigned signature pairs can be positioned correctly within the three-dimensional scene, comparing each of the angular correction values determined for the signature pairs with a predetermined correction value, creating a 3D data map of the captured scene objects within the captured image of the three-dimensional scene are carried out, or the image capture method in which as long as the number of selected signature pairs is greater than a predetermined limit value, insofar as the angular correction values of the signature pairs deviate from each other by more than the specified correction value, the steps of adjusting the filtering algorithm so that after filtering with the adjusted filtering algorithm a number of selected signature pairs is obtained which is smaller than the number obtained in the previous filtering step, and repeating the comparison, and insofar as the angular correction values of the signature pairs deviate from each other by at most the specified correction value, the steps of triangulation calculation to determine depth data for the respective scene objects and creating a 3D data map of the captured scene objects within the captured image of the three-dimensional scene are carried out, even three-dimensional scenes that are difficult to capture can be reliably assigned with regard to the scene objects and corresponding 3D data maps can be created without errors. Deviations in the relative orientation of the cameras of the stereo camera to each other can be precisely taken into account. The angular correction values that are identified in the determination step can be used as state variables for the variation addressed above, e.g. for the square sum minimization of the vertical disparity.

The angular correction values are characteristic angles for the relative positional relationship of the cameras to each other, for example a tilt of a baseline plane, a baseline tilt, a relative tilt of the camera image capture directions or a tilt of camera coordinate axes to each other.

The determination method in which the triangulation calculation includes the angular correction values of the selected signature pairs leads to particularly accurate 3D data values.

The method in which, during the capturing of the images, data are simultaneously acquired from inertial measuring units to which the cameras are fixedly connected allows the inclusion of instantaneous changes in the position of the cameras relative to each other, for example due to vibrations. This data acquisition then takes place in real time. A time constant of this data acquisition may be less than 500 ms and may in particular be less than 100 ms. The data acquired by the inertial measuring units can provide raw information on a necessary correction of the relative position of the cameras to each other, which is then optimized by the image capture. A corresponding position deviation detection can also be used for the relative position calibration of the cameras to each other. This can be done in particular prior to executing the respective triangulation step during the image capture method.

It is another object of the invention to improve the data acquisition reliability when imaging a measurement object.

This object is achieved according to the invention by a method for producing a redundant image of a measurement object comprising the steps of linking at least three cameras whose entrance pupil centers define a camera arrangement plane, placing the measurement object in the field of view of the cameras, performing triangulation measurements of at least one selected measurement point of the measurement object using at least three different camera pairs of the cameras, and comparing the results of the triangulation measurements.

According to the invention, it has been recognized that the various cameras, which are provided for example in a camera system for enabling the autonomous method, can cooperate with each other for redundant imaging of a measurement object. In doing so, the cameras are linked accordingly so that capture results of a camera pair can be compared and checked by using a third camera. As a result, capture errors can be detected and true redundancy can even be produced by allowing three independent capture results to be compared, wherein the acquisition data are qualified as correct if at least two of the three capture results match each other. The measurement object can be arbitrary as long as the measurement object has textures or structures and contains depth information about them.

The advantages of an apparatus according to the invention and comprising three cameras in the camera arrangement plane correspond to those already explained above in connection with the methods. The apparatus may comprise at least one camera that is fixedly connected to an inertial measuring unit.

The three cameras can be arranged in the shape of a triangle, especially an isosceles triangle.

An arrangement comprising six cameras leads to a further improved imaging redundancy. The six cameras may be arranged in the form of a hexagon, in particular in the form of a regular hexagon. The cameras can be arranged in the camera arrangement plane.

The use of an additional remote camera arranged remotely by at least a factor of 2 in comparison to the distances of these adjacently arranged cameras enables a security matching of the results of the image capture by the three adjacently arranged cameras. The three cameras that are arranged adjacent to each other may be located in the camera arrangement plane. A distance factor for characterizing the distance of the remotely arranged camera in comparison to the distances of the adjacently arranged cameras may be greater than 2, may be greater than 3, may be greater than 4, may be greater than 5, and may also be, for example, 10. This distance factor can be selected in such a manner that a close range up to a close range limit is covered by the adjacently arranged cameras and a far range of the field of view of the cameras is covered by adding the remotely arranged camera starting from this close range limit.

An arrangement configured such that the remotely arranged camera is located in the camera arrangement plane of the three adjacent cameras simplifies the alignment of the triangulation measurements.

The connection of at least one of the cameras with an inertial measuring unit also enables an acceleration measurement of the respective camera and a corresponding evaluation of captured acceleration values.

Examples of embodiments of the invention are explained in more detail below with reference to the drawing.

DESCRIPTION OF THE PREFERRED EMBODIMENTS

Figure 1:
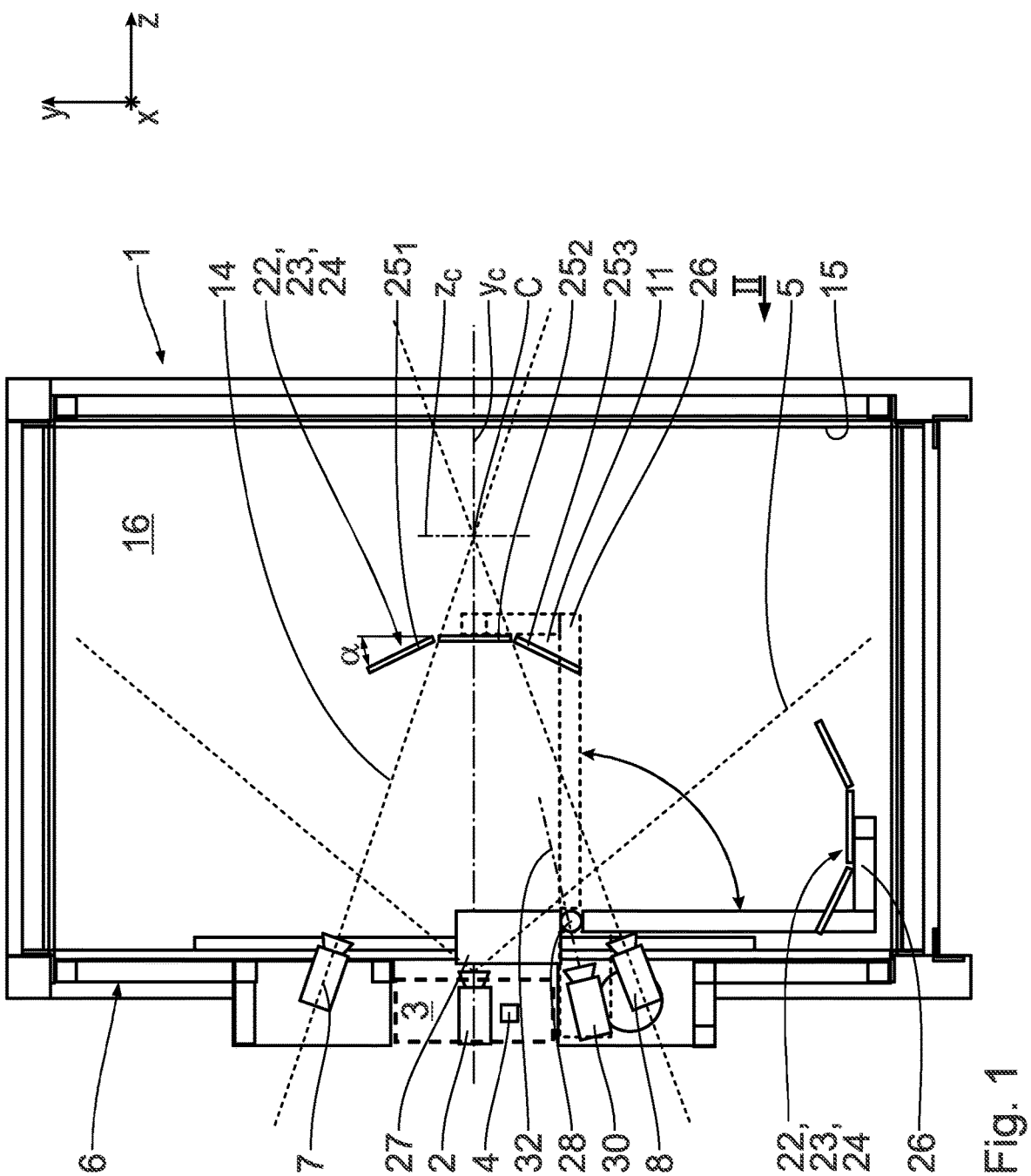
FIG. 1 shows a top view onto an apparatus for calibrating a three-dimensional position of a center of an entrance pupil of a camera, wherein an additional calibration surface is shown both in a neutral position outside a camera field of view and in an operating position in the camera field of view.

A calibration apparatus 1 serves to calibrate a three-dimensional position of a center of an entrance pupil of a camera 2 that is to be calibrated. The camera 2 to be calibrated is arranged within a cuboid mounting volume 3, which is highlighted by dashed lines in FIGS. 1 and 2. The camera 2 to be calibrated is firmly mounted within the mounting volume 3 when the calibration procedure is carried out. A mount 4, which is merely implied in FIG. 1, serves for this purpose. The camera 2 to be calibrated is held by the mount 4 in such a manner that the camera 2 covers a predetermined calibration field of view 5, the boundaries of which are shown in dashed lines in the side view of the apparatus 1 according to FIG. 1.

The camera 2 to be calibrated may, for example, be a camera for a vehicle that is to be used to provide an "autonomous driving" function.

Figure 2:
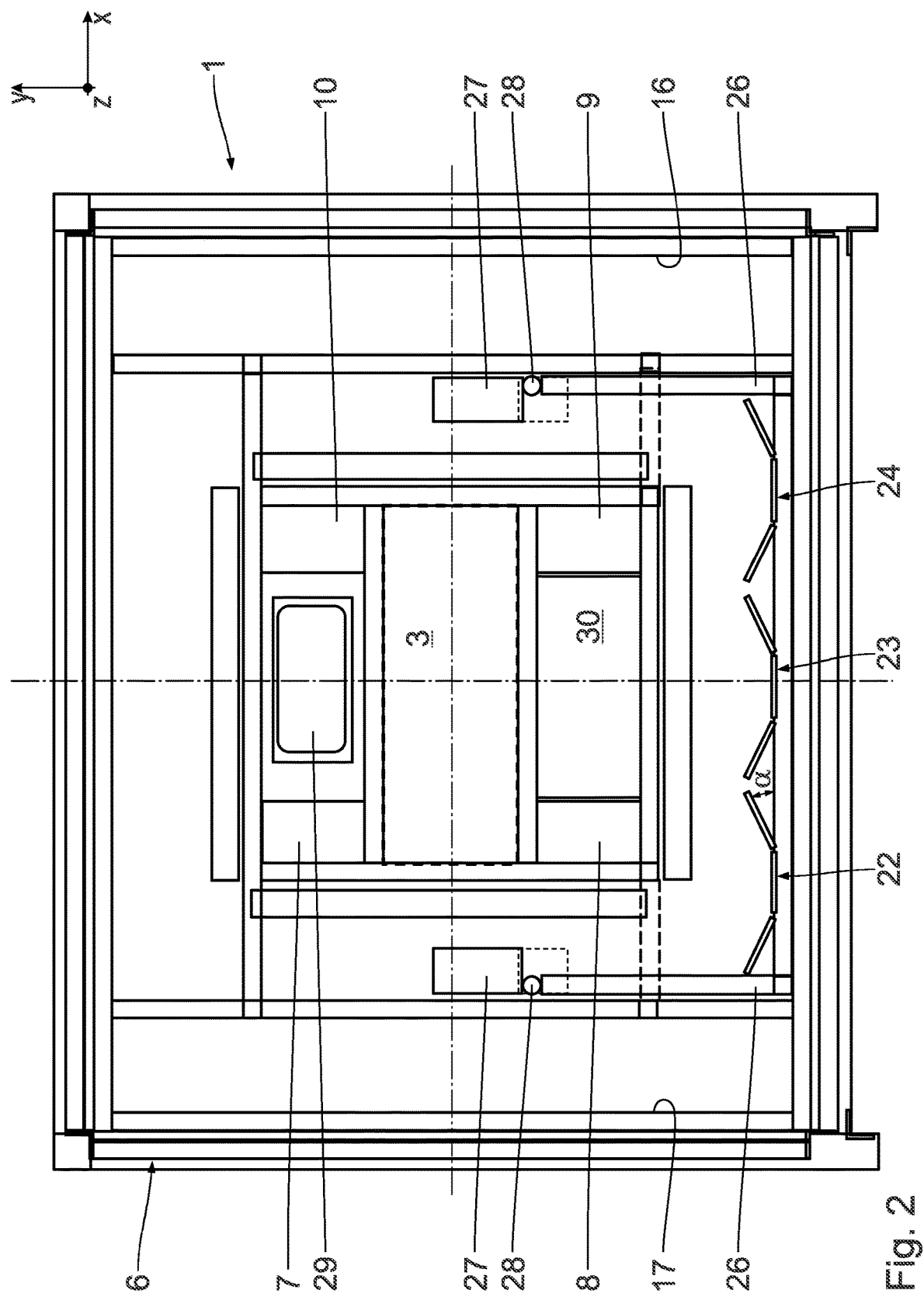
FIG. 2 shows a view from direction II in FIG. 1 with additional calibration surfaces in the neutral position.
Figure 3:
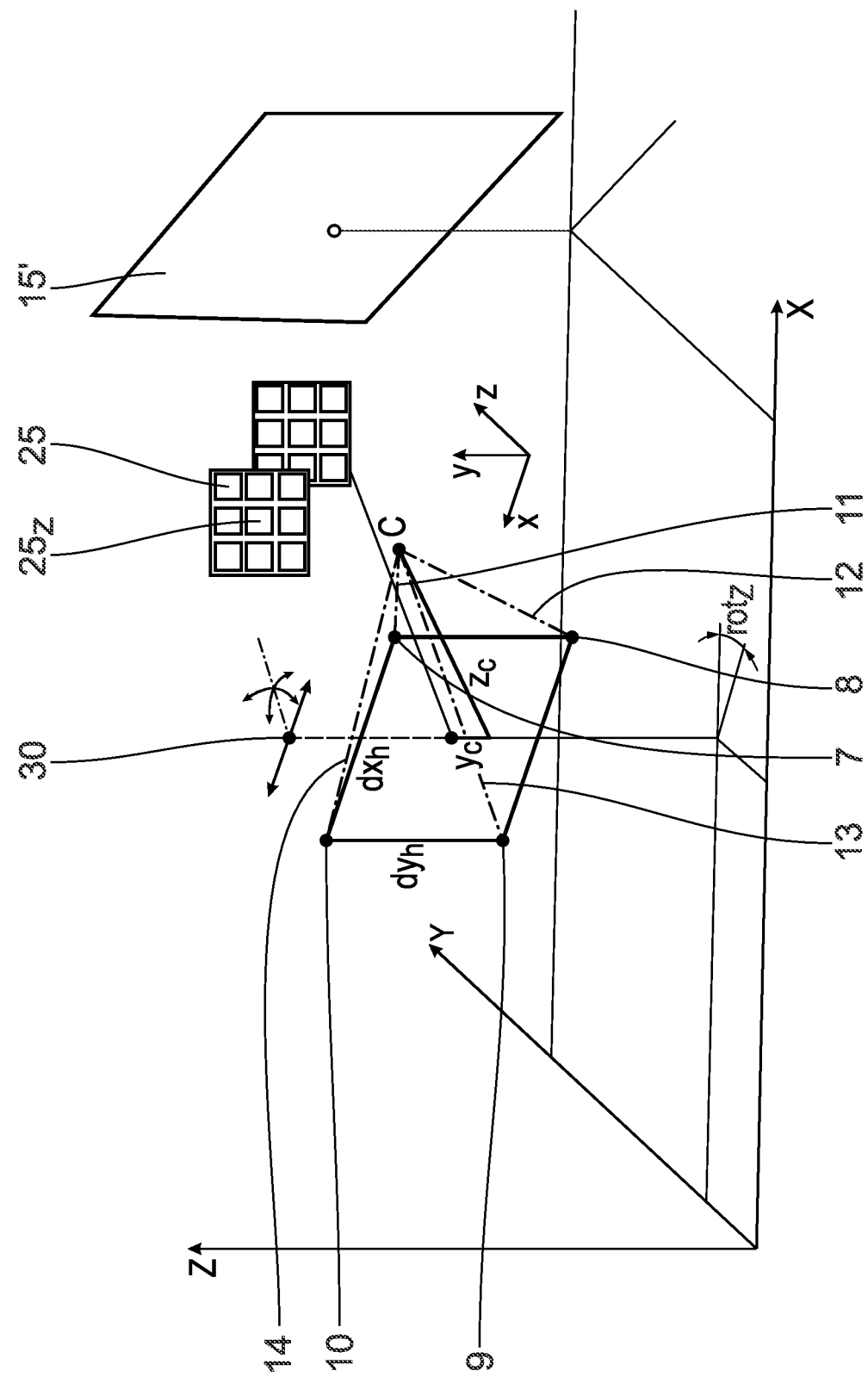
FIG. 3 shows a schematic representation to illustrate positional relationships between components of the calibration apparatus.

To facilitate the description of positional relationships, in particular of cameras of the apparatus 1 to each other and to the field of view 5, an xyz coordinate system is drawn in each of the FIGS. 1 to 3, unless otherwise indicated. In FIG. 1, the x-axis runs perpendicular to the drawing plane and into it. The y-axis runs upwards in FIG. 1. The z-axis runs to the right in FIG. 1. In FIG. 2, the x-axis runs to the right, the y-axis runs upwards and the z-axis runs out of the drawing plane perpendicular to the drawing plane.

An entire viewing range of the calibration field of view 5 can cover a detection angle of 100° in the xz plane, for example. Other detection angles between, for example, 10° and 180° are also possible. In principle, it is also possible to calibrate cameras with a detection angle that is greater than 180°.

The mount 4 is fixed to a supporting frame 6 of the calibration apparatus 1.

The calibration apparatus 1 has at least two and, in the version shown, a total of four stationary reference cameras 7, 8, 9 and 10 (cf. FIG. 3), of which only two stationary reference cameras, namely reference cameras 7 and 8, are visible in FIG. 1. The stationary reference cameras 7 to 10 are also mounted on the supporting frame 6. The stationary reference cameras 7 to 10 serve to record the calibration field of view 5 from different directions.

FIG. 3 shows exemplary dimensional parameters that play a role in the calibration apparatus 1.

Main lines of sight 11, 12, 13, 14 of the stationary reference cameras 7 to 10 are shown in dash-dotted lines in FIG. 3.

These main sight lines 11 to 14 intersect at a point C (cf. FIGS. 1 and 3). The coordinates of this intersection point C are marked $x_c$, $y_c$ and $z_c$ in FIGS. 1 and 3.

An x-distance between the reference cameras 7 and 10, on the one hand, and the reference cameras 8 and 9, on the other hand, is indicated in FIG. 3 with $dx_h$. An x-coordinate of the stationary reference cameras 7 and 8, on the one hand, and 9 and 10, on the other hand, is the same in each case.

A y-distance between the stationary reference cameras 7 and 8, on the one hand, and 9 and 10, on the other hand, is marked with $dy_h$ in FIG. 3. A y-coordinate of the stationary reference cameras 7 and 10, on the one hand, and 8 and 9, on the other hand, is the same in each case.

The calibration apparatus 1 further has at least one stationary main calibration surface, in the illustrated embodiment example three main calibration surfaces 15, 16 and 17, which are specified by corresponding calibration panels. The main calibration surface 15, in the arrangement according to FIGS. 1 and 2, extends parallel to the xy-plane and at a z-coordinate which is greater than $z_c$. The two further, lateral main calibration surfaces 16, 17, in the arrangement according to FIGS. 1 and 2, extend parallel to the yz-plane on both sides of the arrangement of the four stationary reference cameras 7 to 10. The main calibration surfaces 15 to 17 are also mounted to be stationary on the supporting frame 6.

Figure 6:
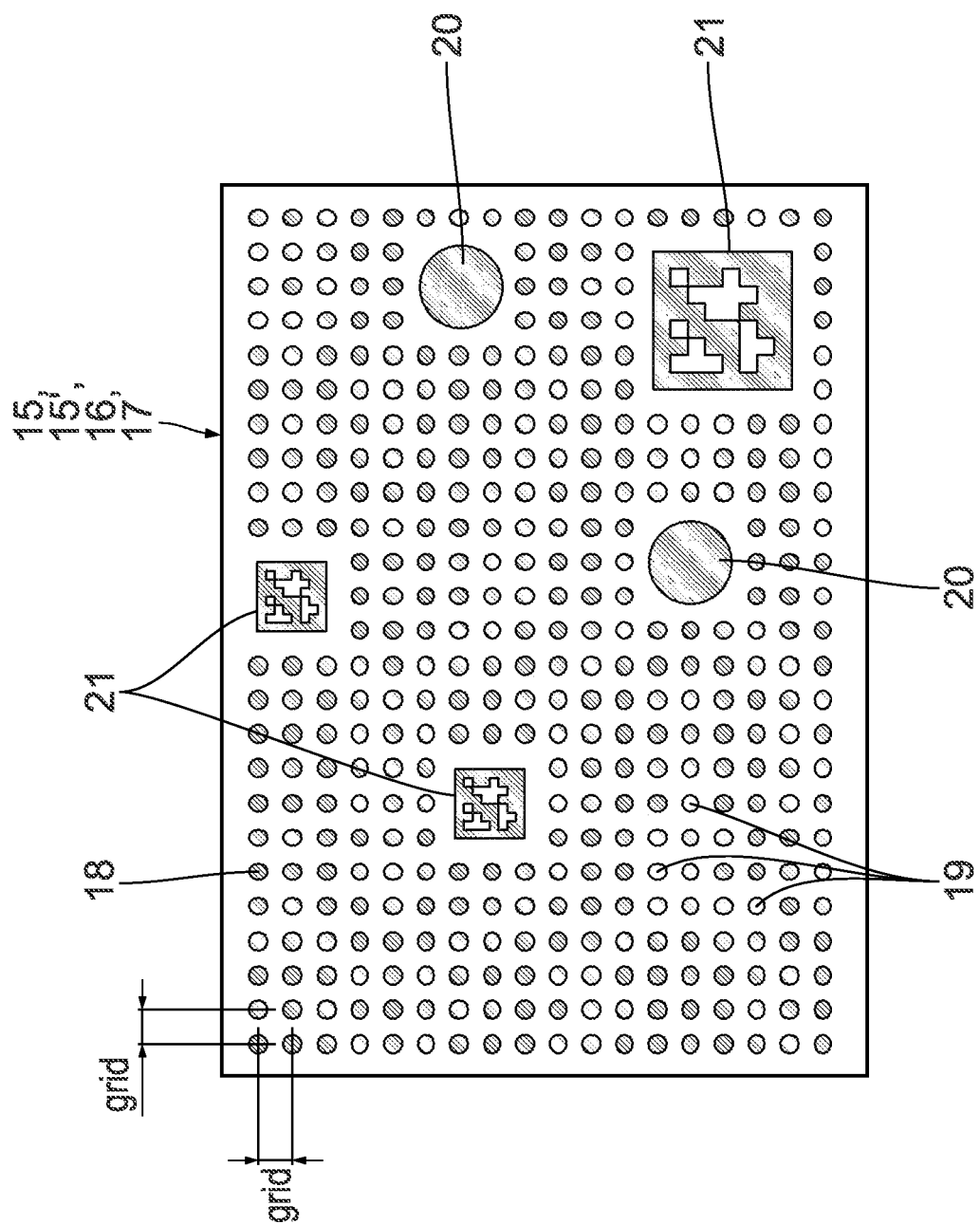
FIG. 6 shows a calibration panel with a calibration surface, comprising calibration structures, which can be used as main calibration surface and/or as additional calibration surface in the calibration apparatus.

The main calibration surfaces have stationary main calibration structures, examples of which are shown in FIG. 6. At least some of these calibration structures are arranged in the calibration field of view 5. The main calibration structures can have a regular pattern, for example arranged in the form of a grid. Corresponding grid points which are part of the calibration structures are shown in FIG. 6 at 18. The calibration structures may have colored pattern elements, as illustrated in FIG. 6 at 19. Furthermore, the calibration structures may have different sizes. Pattern elements that are enlarged compared to the grid points 18 are highlighted in FIG. 6 at 20 as main calibration structures. Furthermore, the main calibration structures may comprise coded pattern elements, for example QR codes 21 (cf. FIG. 6).

An arrangement of the main calibration surfaces 15 to 17 aligned to the xyz coordinate system according to FIGS. 1 and 2 is not mandatory. FIG. 3 shows an exemplarily tilted arrangement of a main calibration surface 15', which for example has an angle to the xy-plane.

FIG. 3 also shows an external XYZ coordinate system, for example of a production hall, in which the calibration apparatus 1 is housed. The xyz coordinate system of the coordinate system of the calibration apparatus 1, on the one hand, and the XYZ coordinate system of the production hall, on the other hand, can be tilted against each other, as illustrated in FIG. 3 by a tilt angle $rot_z$.

The main calibration structures 15 to 17, 15' are thus present in a main calibration structure main plane (xy plane in the arrangement according to FIGS. 1 and 2) and additionally in a main calibration structure angular plane (yz plane in the arrangement according to FIGS. 1 and 2), wherein the main calibration structure main plane xy is arranged at an angle greater than 5°, namely at an angle of 90°, to the main calibration structure angular plane yz. This angle to the main calibration structure angular plane yz may be greater than 10°, may be greater than 20°, may be greater than 30°, may be greater than 45° and may also be greater than 60°, depending on the embodiment. Small angles, for example in the range between 1° and 10°, can be used to approximate a curved calibration structure surface with the main calibration structures. In the arrangement according to FIGS. 1 and 2 and additionally in the arrangement of the main calibration surface 15' according to FIG. 3, more than two main calibration structure surfaces 15 to 17, 15' may be arranged in different main calibration structure planes.

A position of the respective main calibration surface, for example the main calibration surface 15' in comparison to the xyz coordinate system can be defined via a position of a center of the main calibration surface as well as tilt angles of the main calibration surface 15' to the xyz coordinates. A further parameter characterizing each of the main calibration surfaces 15 to 17 or 15' is a grid spacing grid of the grid points 18 of the calibration structure, which grid spacing is illustrated in FIG. 6. The two grid values, which are given horizontally and vertically for the main calibration surface 15' in FIG. 6, do not necessarily have to be equal to each other, but they must be fixed and known.

Also, the positions of the colored pattern elements 19, the enlarged pattern elements 20 and/or the coded pattern elements 21 within the grid of the grid points 18 is fixed in each case for the main calibration surface 15 to 17, 15'. These positional relationships of the various pattern elements 18 to 21 to each other serve to identify the respective main calibration surface, to determine the absolute position of the respective main calibration surface in space. The enlarged pattern elements 20 can be used to support the respective position determination. Different sizes of the pattern elements 18 to 20 and also of the coded pattern elements 21 enable a calibration measurement in the near and in the far range as well as also a measurement in which the main calibration surfaces 15 to 17, 15' are, if necessary, strongly tilted with respect to the xy-plane.

Furthermore, the calibration apparatus 1 has at least one and, in the embodiment shown, three additional calibration surfaces 22, 23 and 24 comprising additional calibration structures 25. The additional calibration surfaces 22 to 24 are implemented by shell-shaped calibration panels. The additional calibration structures 25 are in each case arranged on the additional calibration surface 22 to 24 in the form of a 3×3 grid. The additional calibration structures 25 can in turn each have pattern elements of the type of the pattern elements 18 to 21 explained above in connection with the main calibration surfaces.

The additional calibration surfaces 22 to 24 are mounted together on a movable holding arm 26. The latter can be swiveled about a swivel axis 28, which runs parallel to the x-direction, via a geared motor 27, i.e. a calibration surface displacement drive. Via the geared motor 27, the additional calibration structures 22 to 24 can be displaced between a neutral position and an operating position. The neutral position of the additional calibration structures 22 to 24, in which they are arranged outside the calibration field of view 5, is shown solid in FIGS. 1 and 2. Dashed in FIG. 1 is shown an operating position of the holding arm 26 and the additional calibration surfaces 22 to 24 which operating position is swiveled upwards in comparison to the neutral position. In the operating position, the additional calibration surfaces 22 to 24 are arranged in the calibration field of view 5.

In the operating position, a central additional calibration structure $25_Z$ (cf. also FIG. 3) is located parallel to the xy-plane, for example, as shown in FIGS. 1 and 2. The 3×3 grid arrangement of the additional calibration structures 25 is then located in the operating position in three rows $25_1$, $25_2$ and $25_3$ that run along the x-direction and in three columns that run parallel to the y-direction. In each case adjacent rows and in each case adjacent columns of the additional calibration structures 25 are tilted relative to each other by a tilt angle α, which can fall within the range between 5° and 45°, for example within the range of 30°. For the four grid areas that are each arranged in the corners of the 3×3 grid, this tilting by the tilt angle α is present about two axes that are perpendicular to each other. This results in the shell-shaped basic structure of the respective additional calibration surface 22 to 24. The additional calibration structures 25 are present in a 3D arrangement that deviates from a flat surface.

The calibration apparatus 1 further includes an evaluation unit 29 for processing recorded camera data of the camera 2 to be calibrated as well as of the stationary reference cameras 7 to 10 as well as status parameters of the apparatus, i.e. in particular the position of the additional calibration surfaces 22 to 24 as well as of the main calibration surfaces 15 to 17 as well as positions and line-of-sight curves of the reference cameras 7 to 10. The evaluation unit 29 may have a memory for image data.

The calibration apparatus 1 also includes a movable reference camera 30, which also serves to record the calibration field of view 5.

FIG. 3 illustrates degrees of freedom of movement of the movable reference camera 30, namely two tilt degrees of freedom and one translational degree of freedom.

Figure 4:
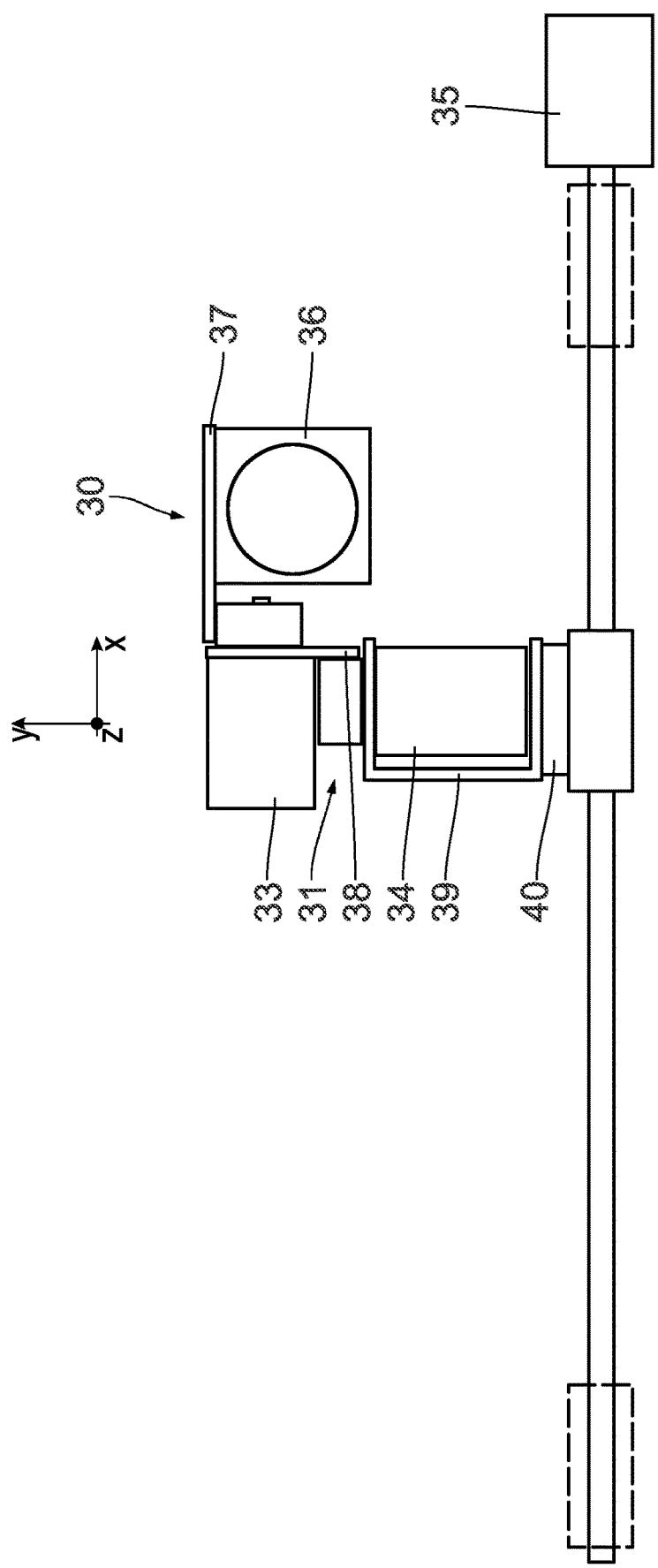
FIG. 4 shows a further detail view of a movable reference camera of the calibration apparatus including a camera displacement drive for moving the movable reference camera in multiple translational/rotational degrees of freedom.

FIG. 4 shows details of the movable reference camera 30. The latter can be displaced by means of a camera displacement drive 31 between a first field-of-view recording position and at least one further field-of-view recording position, which differs from the first field-of-view recording position in an image capture direction (cf. recording direction 32 in FIG. 1).

The camera displacement drive 31 includes a first swivel motor 33, a second swivel motor 34 and a linear displacement motor 35. A camera head 36 of the movable reference camera 30 is mounted on a swivel component of the first swivel motor 33 via a retaining plate 37. The camera head 36 can be swiveled about an axis that is parallel to the x-axis via the first swivel motor 33. The first swivel motor 33 is mounted on a swivel component of the second swivel motor 34 via a further supporting plate 38. Via the second swivel motor 34, it is possible to swivel the camera head 36 about a swivel axis that is parallel to the y-axis.

The second swivel motor 34 is mounted on a linear displacement unit 40 of the linear displacement motor 35 via a retaining bracket 39. Via the linear displacement motor 35 a linear displacement of the camera head 36 parallel to the x-axis is possible.

The camera displacement drive 31 and also the camera head 36 of the reference camera 30 are in signal connection with the evaluation unit 29. The position of the camera head 36 is precisely transmitted to the evaluation unit 29 depending on the position of the motors 33 to 35 and also depending on the mounting situation of the camera head 36 in relation to the first swivel motor 33.

The angular position of the camera head 36 that can be preset via the first swivel motor 33 is also referred to as the pitch angle. Instead of the first swivel motor 33, a change of a pitch angle can also be implemented via an articulated connection of the camera head 36 via an articulated axis that is parallel to the x-axis and a linear drive which can be displaced in the y-direction with two stops for presetting two different pitch angles and which is connected to the camera head 36. The angular position of the camera head 36 that can be preset via the second swivel motor 34 is also referred to as the yaw angle.

Figure 5:
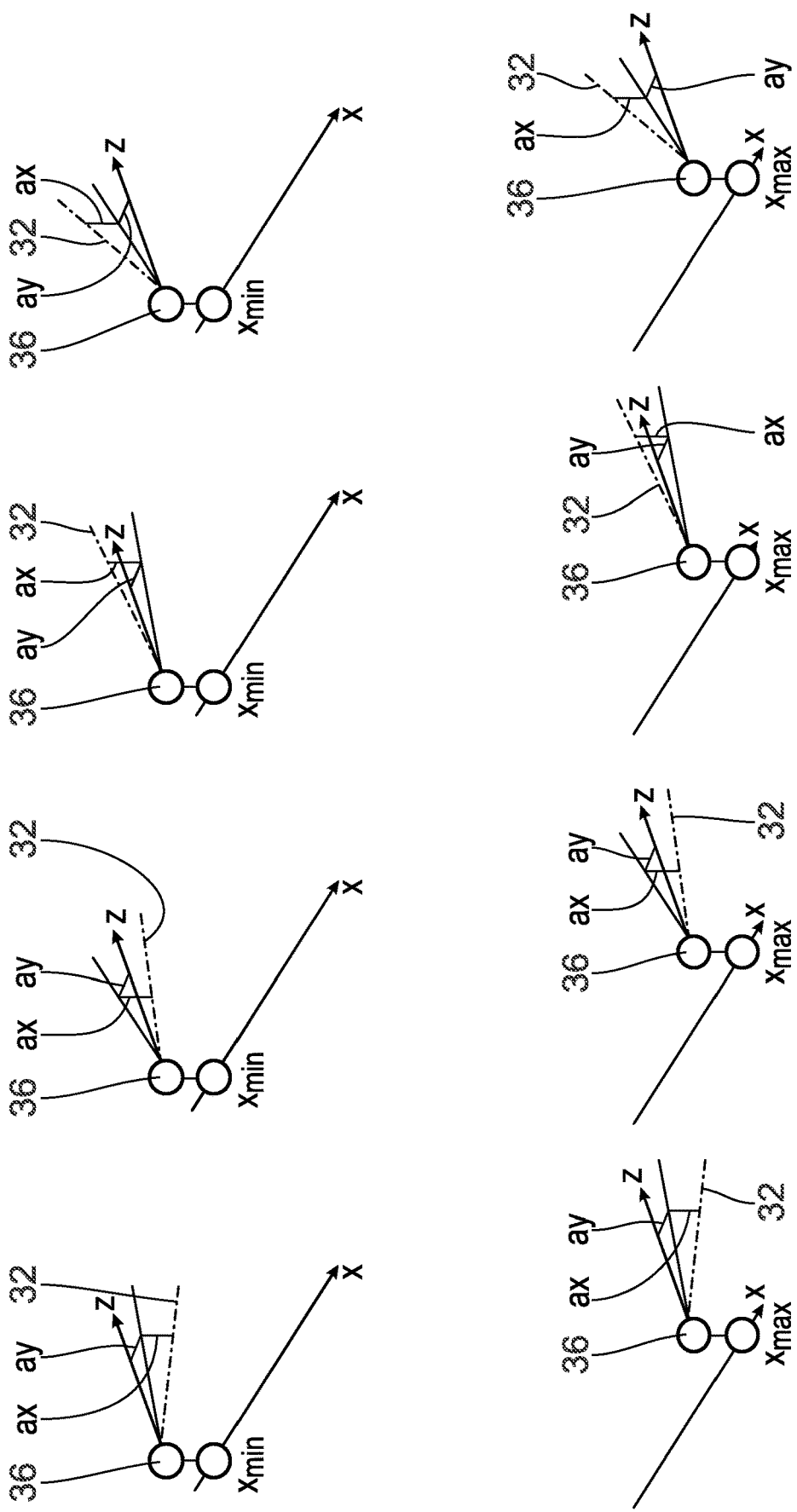
FIG. 5 schematically shows different orientations of the movable reference camera, namely a total of eight orientation variants.

FIG. 5 illustrates an example of eight variants of positioning the camera head 36 of the movable reference camera 30 using the three degrees of freedom of movement that are illustrated in FIG. 3.

The image capture direction 32 is in each case shown dash-dotted, depending on the pitch angle ax and yaw angle ay set in each case. In the top row of FIG. 5, the camera head is provided at a small x-coordinate $x_{min}$. Compared thereto, in the bottom row of FIG. 5, the camera head 36 is provided at a larger x-coordinate $x_{max}$. The eight image capture directions according to FIG. 5 represent different parameter triples (position x; ax; ay) comprising two discrete values for each of these three parameters.

In one variant of the calibration apparatus, the movable reference camera 30 can also be dispensed with.

To calibrate a three-dimensional position of a center of an entrance pupil of the camera 2 to be calibrated, the calibration apparatus 1 is used as follows:

First, the camera 2 to be calibrated is held in the mount 4.

Subsequently, the stationary main calibration surfaces 15 to 17 or 15' are captured with the camera 2 to be calibrated and the reference cameras 7 to 10 as well as 30, wherein the additional calibration surfaces 22 to 24 are in the neutral position.

The additional calibration surfaces 22 to 24 are then displaced between the neutral position and the operating position with the calibration surface displacement drive 27. The additional calibration surfaces 22 to 24 are then captured by the camera 2 to be calibrated and by the reference cameras 7 to 10 and 30, wherein the additional calibration structures 25 are in the operating position. The recorded image data of the camera 2 to be calibrated and of the reference cameras 7 to and 30 are then evaluated by the evaluation unit 29. This evaluation is carried out via a vector analysis of the recorded image data, considering the positions of the recorded calibration structures 18 to 21 as well as 25.

When the main calibration surfaces 15 to 17 and the additional calibration surfaces 22 to 24 are captured, a first capture of the main calibration surfaces 15 to 17, 15', on the one hand, and of the additional calibration surfaces 22 to 24, on the other hand, can be performed by the movable camera 30 in the first field-of-view recording position and, after displacement of the movable reference camera 30 with the camera displacement drive 31, in the at least one further field-of-view recording position, wherein the image data of the movable reference camera 30 in the at least two field-of-view recording positions are also taken into account when evaluating the recorded image data.

A capture sequence of the calibration surfaces 15 to 17 and 22 to 24 can be as follows: First, the main calibration surfaces 15 to 17 are captured by the movable camera 30 in the first field-of-view recording position. Then the additional calibration surfaces 22 to 24 are displaced to the operating position and again captured by the movable reference camera 30 in the first field-of-view recording position. The movable reference camera 30 is then displaced into the further field-of-view recording position, wherein the additional calibration surfaces 22 to 24 remain in the operating position. Subsequently, the additional calibration surfaces 22 to 24 are captured by the movable reference camera 30 in the further field-of-view recording position. The additional calibration surfaces 22 to 24 are then moved to the neutral position and a further capture of the main calibration surfaces 15 to 17 takes place with the movable reference camera in the further field-of-view recording position. During this sequence, the main calibration surfaces 15 to 17 can also be captured by the stationary reference cameras 7 to 10 during periods in which the additional calibration surfaces 22 to 24 are in the neutral position and, if the additional calibration surfaces 22 to 24 are in the operating position, these additional calibration surfaces 22 to 24 can also be captured by the stationary reference cameras 7 to 10.

Figure 7:
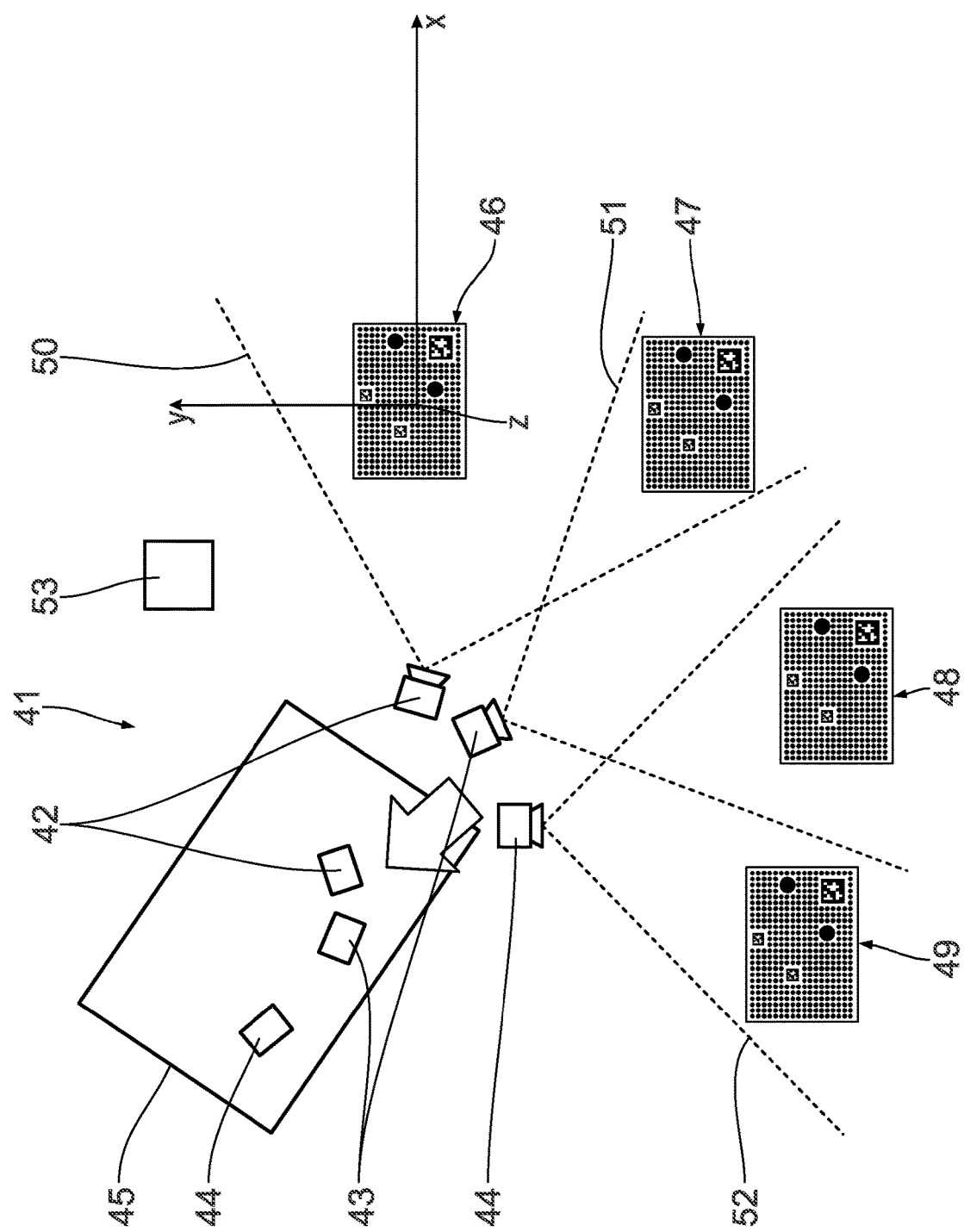
FIG. 7 in a view from above, shows an arrangement of a system for determining relative positions of centers of entrance pupils of at least two cameras that are mounted on a common supporting frame.

With reference to FIG. 7, a system 41 for determining mutual relative positions of centers of entrance pupils of at least two cameras 42, 43, 44 that are mounted on a common supporting frame 45 is described below.

The cameras 42 to 44 may have been calibrated in advance with regard to the position of their respective entrance pupil center with the aid of the calibration apparatus 1.

A nominal position of the cameras 42 to 44 relative to the supporting frame 45, i.e. a target installation position, is known when this relative position determination is carried out by means of the system 41.

The cameras 42 to 44 may, for example, be cameras on a vehicle to be used to provide an "autonomous driving" function.

The system 41 has a plurality of calibration structure carrier components 46, 47, 48 and 49. The calibration structure carrier component 46 is a master component for specifying a master coordinate system xyz. In FIG. 7, the x-axis of this master coordinate system extends to the right, the y-axis extends upward, and the z-axis extends out of the drawing plane perpendicular to the drawing plane.

For the calibration structures, which are applied to the calibration structure carrier components 46 to 49, what was explained above for the calibration structures 18 to 21 in connection in particular with FIG. 6 applies.

The calibration structure carrier components 46 to 49 are arranged around the supporting frame in an operating position of the system 41 such that each of the cameras 42 to 44 captures calibration structures of at least two of the calibration structure carrier components 46 to 49. Such an arrangement is not mandatory, so it is possible for at least some of the cameras 42 to 44 to capture calibration structures from only exactly one of the calibration structure carrier components 46 to 49. Moreover, the arrangement of the calibration structure carrier components 46 to 49 is such that at least one of the calibration structures on exactly one of the calibration structure carrier components 46 to 49 is captured by two of the cameras 42 to 44. To ensure these conditions, if necessary, the supporting frame 45 can be displaced relative to the calibration structure carrier components 46 to 49, which do not change their positions in each case.

FIG. 7 illustrates an example of the position of the supporting frame 45 with actual positions of the cameras 42, 43, 44 on the supporting frame, which is not shown again, in such a manner that a field of view 50 of the camera 42 captures the calibration structures of the calibration structure carrier components 46 and 47, while the camera 43 with its field of view 51 captures the calibration structures of the calibration structure carrier components 47 and 48 and while the further camera 44 with its field of view 52 captures the calibration structures of the calibration structure carrier components 48 and 49.

A relative position of the calibration structure carrier components 46 to 49 to each other does not have to be strictly defined in advance, but must not change during the position determination procedure by means of the system 41.

The system 41 also includes an evaluation unit 53 for processing recorded camera data from the cameras 42 to 44 and, if applicable, status parameters during the position determination, i.e. in particular an identification of the respective supporting frame 45.

To determine the relative positions of the center of the entrance pupil of the cameras 42 to 44, the system 41 is used as follows:

In a first preparatory step, the cameras 42 to 44 are mounted on the common supporting frame 45. In a further preparatory step, the calibration structure carrier components 46 to 49 are arranged as a group of calibration structure carrier components around the supporting frame 45. This can also be done by laying out the group of calibration structure carrier components 46 to 49 in a preparatory step and then positioning the supporting frame relative to this group. In addition, the xyz coordinate system is defined via the alignment of the master component 46. The other calibration structure carrier components 47 to 49 do not have to be aligned to this xyz coordinate system.

Now the calibration structure carrier components 46 to 49 that are located in the field of view of the cameras 42 to 44 are captured in a predetermined relative position of the supporting frame 45 to the group of calibration structure carrier components 46 to 49, for example in the actual position of the cameras 42 to 44 according to FIG. 7. The recorded image data of the cameras 42 to 44 are then evaluated by the evaluation unit 53 so that the exact positions of the centers of the entrance pupils as well as the image capture directions of the cameras 42 to 44 are determined in the coordinate system of the master component 46. These actual positions are then converted into coordinates of the supporting frame 45 and matched with the nominal target positions. This can be done in the context of a best fit procedure.

In the determination process, the supporting frame can also be displaced between different camera capture positions such that at least one of the cameras whose relative position is to be determined captures a calibration structure carrier component that was not previously detected by that camera. This step of capturing and displacing the supporting frame can be repeated until, for all cameras whose relative positions to each other are to be determined, the condition is met that each of the cameras captures at least calibration structures of two of the calibration structure carrier components, wherein at least one of the calibration structures is captured by two of the cameras.

Figure 8:
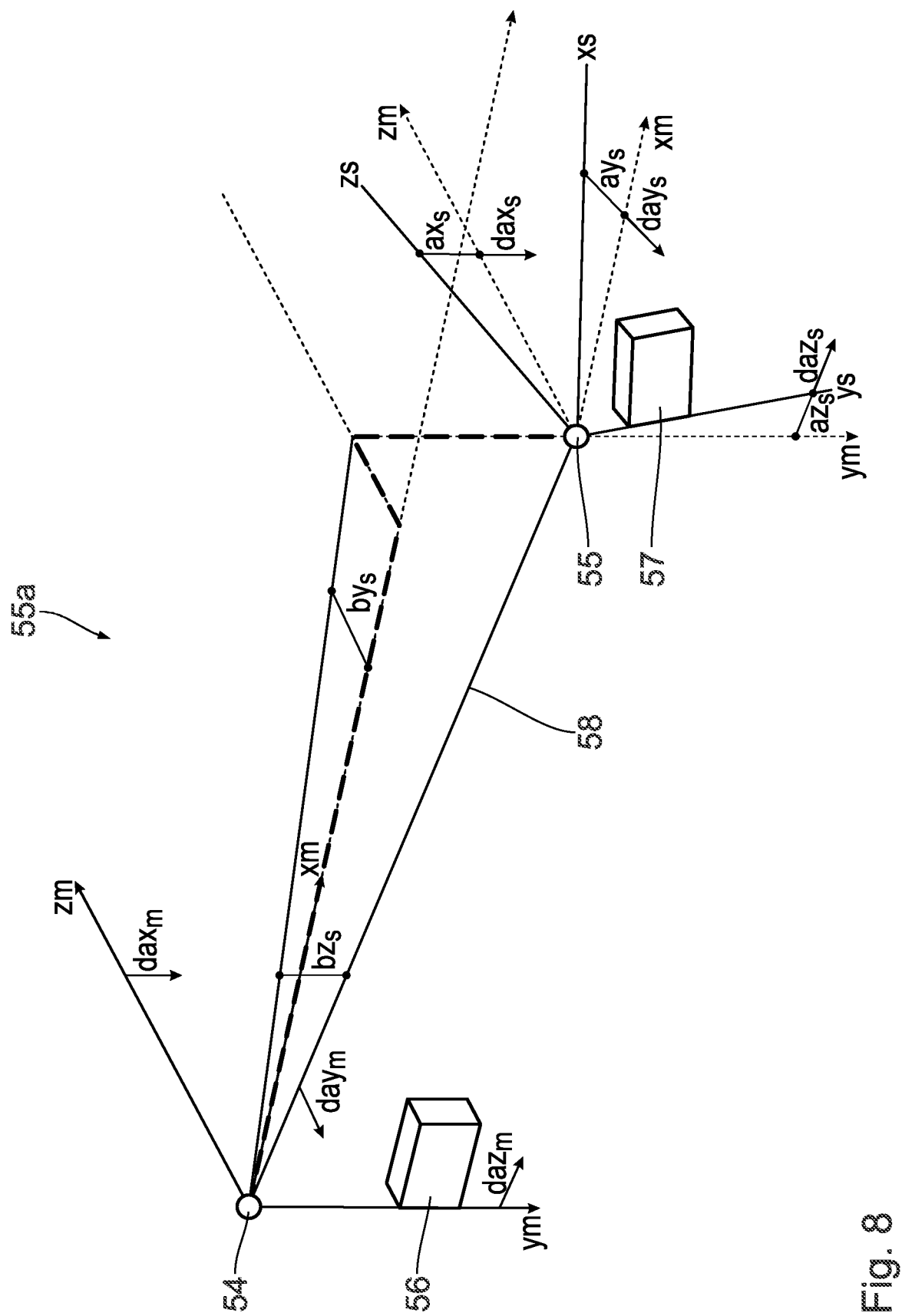
FIG. 8 schematically shows two cameras of a stereo camera for capturing three-dimensional images, wherein coordinates and position parameters for determining angular correction values of the cameras to each other are illustrated.
Figure 9:
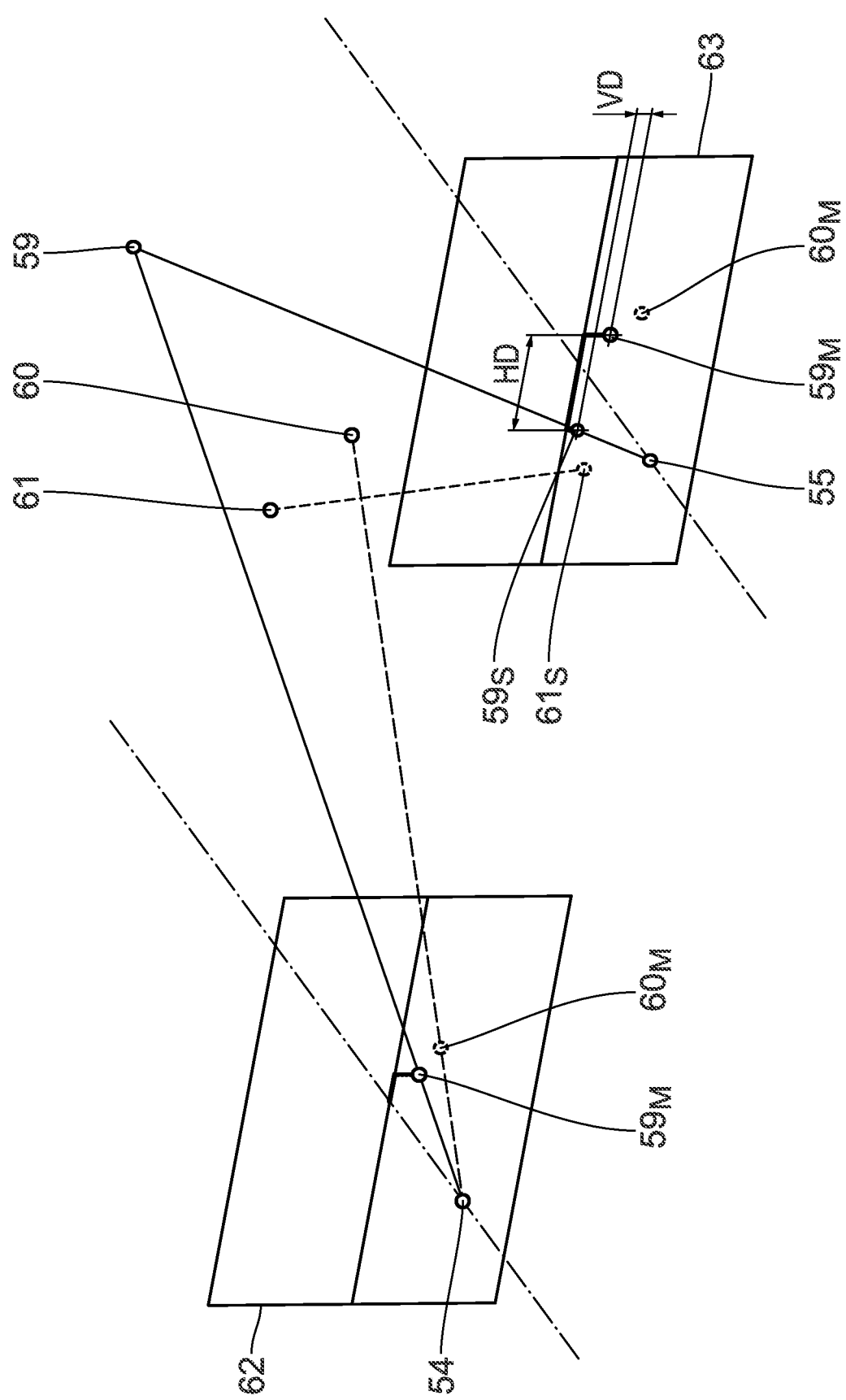
FIG. 9 again schematically shows the two cameras of the stereo camera according to FIG. 8 capturing scene objects of a three-dimensional scene, wherein position deviation parameters of characteristic signatures of the images captured by the cameras are highlighted.
Figure 10:
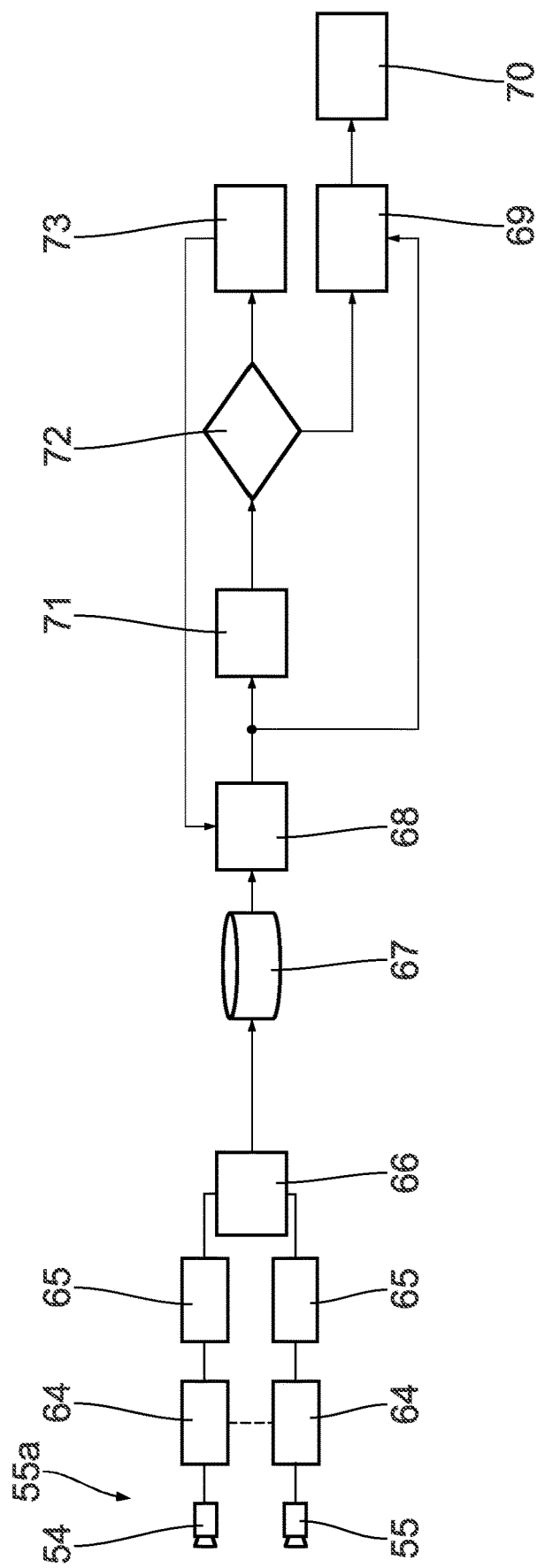
FIG. 10 shows a block diagram to illustrate a method for capturing three-dimensional images with the aid of the stereo camera according to FIGS. 8 and 9.

With reference to FIGS. 8 to 10, a method for capturing three-dimensional images with the aid of a stereo camera 55a having two cameras 54, 55 is described below. These cameras 54 to 55 may have been calibrated in a preparatory step with the aid of the calibration apparatus 1 and also measured with regard to their relative position with the aid of the system 41. The cameras 54, 55 are again mounted on a supporting frame.

The camera 54 shown on the left in FIG. 8 is used as the master camera to define a master coordinate system xm, ym and zm. Zm is the image capture direction of the master camera 54. The second camera 55 shown on the right in FIG. 8 is then the slave camera.

The master camera 54 is permanently connected to an inertial master measuring unit 56 (IMU), which can be designed as a rotation rate sensor, in particular in the form of a micro-electro-mechanical system (MEMS). The master measuring unit 56 measures angular changes of a pitch angle $dax_m$, a yaw angle $day_m$ and a roll angle $daz_m$ of the master camera 54 and thus allows to monitor position deviations of the master coordinate system xm, ym, zm in real time. A time constant of this real-time position deviation detection can be better than 500 ms, can be better than 200 ms and can also be better than 100 ms.

The slave camera 55 is also firmly connected to an associated inertial slave measuring unit 57, via which angular changes of a pitch angle $dax_s$ a yaw angle $day_s$ and a roll angle $daz_s$ of the slave camera 55 can be detected in real time, so that relative changes of the slave coordinate system xs, ys, zs with respect to the master coordinate system xm, ym, zm can again be detected in real time in each case. Relative movements of the cameras 54, 55 of the stereo camera 55a with respect to each other can be detected in real time via the measuring units 56, 57 and included in the method for capturing three-dimensional images. The measuring units 56, 57 can be used to predict a change in relative position of the cameras 54, 55 with respect to each other. Image processing performed as part of the three-dimensional image capture can then further improve this prediction as to the relative position. Even if, for example, due to a supporting frame on which the stereo camera 54a is mounted moving on an uneven surface, the cameras 54, 55 continuously move against each other, the result of the three-dimensional image capture is still stable.

A line connecting the centers of the entrance pupils of the cameras 54, 55 is marked 58 in FIG. 8 and represents the baseline of the stereo camera 55a.

In the method for capturing three-dimensional images, the following angles are captured that are relevant to the positional relationship of the slave camera 55 to the master camera 54:

the angle $by_s$, i.e. a tilting of a plane, through which the baseline 58 passes, which is perpendicular to the plane xmzm, to the plane xmym about the tilting axis ym;

bz$_s$: a tilting of the baseline 58 to the plane xmzm about a tilting axis that is parallel to the slave coordinate axis zs, corresponding to the tilting by$_s$;

ax$_s$: a tilting of the slave coordinate axis zs, i.e. the image capture direction of the slave camera 55, relative to the plane xmzm about the slave coordinate axis xs;

ay$_s$: a tilting of the slave coordinate axis xs relative to the master plane xmym about the slave coordinate axis ys, corresponding to the tilting ax$_s$ as well as az$_s$: a tilting of the slave coordinate axis ys relative to the master coordinate plane ymzm about the slave coordinate axis zs, corresponding to the tilts ax$_s$, ay$_s$.

The following procedure is used for capturing three-dimensional images with the aid of the two cameras 54, 55, taking into account, on the one hand, these angles by$_s$, bz$_s$, ax$_s$, ay$_s$, az$_s$ including the angular changes dax$_m$, day$_m$, daz$_m$, dax$_s$, day$_s$, daz$_s$ detected by the measuring units 56, 57:

First, an image of a three-dimensional scene with scene objects 59, 60, 61 (cf. FIG. 9) is captured simultaneously by the two cameras 54, 55 of the stereo camera. This image capture of the images 62, 63 is done simultaneously for both cameras 54, 55 in a capture step 64 (cf. FIG. 10).

The image capture may be integrated over several cycles of an acquisition of the inertial measuring unit 56, 57, in particular over a period of time corresponding to a plurality of time constants of the real-time position deviation measurement detections.

FIG. 9 schematically shows the respective image 62, 63 of the cameras 54 and 55.

The image of scene object 59 is shown in image 62 of master camera 54 at 59$_M$, and the image of scene object 60 is shown at 60$_M$.

The imaging of scene object 59 is shown in image 63 of the slave camera 55 at 59$_S$. The imaging of scene object 61 is shown in image 63 of the slave camera 55 at 61$_S$. In addition, the imagings 59$_M$, 60$_M$ of the master camera 54 can also be found in image 63 of the slave camera 55 at the corresponding x, y coordinates of the image frame.

A y-deviation of the imaging positions 59$_M$, 59$_S$ is called disparity perpendicular to the epipolar line of the respective camera or vertical disparity VD. Correspondingly, an x-deviation of the imaging positions 59$_M$, 59$_S$ of the scene object 59 is called disparity along the epipolar line or horizontal disparity HD. In this context, reference is made to the known terminology on epipolar geometry. The parameter "center of the camera entrance pupil" is called "projection center" in this terminology.

The two imagings 60$_M$, 61$_S$ show the same signature in the images 62, 63, thus are represented with the same imaging pattern in the images 62, 63, but actually originate from the two scene objects 60 and 61, which are different within the three-dimensional scene.

The characteristic signatures of the scene objects 59 to 61 in the images are now determined separately for each of the two cameras 54, 55 in a determination step 65 (cf. FIG. 10).

The signatures determined in step 65 are summarized in a signature list in each case and, in an assignment step 66, the signatures of the captured images 62, 63 determined in step 65 are assigned in pairs. Identical signatures are thus assigned to each other with regard to the captured scene objects.

Depending on the captured three-dimensional scene, the result of the assignment step 66 may be a very high number of assigned signatures, for example several tens of thousands of assigned signatures and correspondingly several tens of thousands of determined characteristic position deviations.

In a further determination step 67, characteristic position deviations of the assigned signature pairs from each other are now determined, for example the vertical and horizontal disparities VD, HD.

For example, the vertical disparity VD determined in each case is added up square for all assigned signature pairs. By varying the angle parameters by$_s$, bz$_s$, ax$_s$, ay$_s$, az$_s$ described above in connection with FIG. 8, this sum of squares can then be minimized. This sum of squares depends on these angles explained above in connection with FIG. 8.

In a subsequent filtering step 68, the determined position deviations are then filtered to select assigned signature pairs that are more likely to belong to the same scene object 59 to 61, using a filter algorithm. The simplest variant of such a filter algorithm is a selection by comparison with a predefined tolerance value, wherein only those signature pairs pass the filter for which the sum of squares is smaller than the predefined tolerance value. This default tolerance value can, for example, be increased until the number of selected signature pairs is smaller than a predefined limit value as a result of the filtering.

In one image algorithm variant, the respective position deviation VD, HD itself can be used to select assigned signature pairs. It is then checked whether the respective position deviation is below a predefined threshold.

In particular, a plurality of thresholds can be examined. For example, it can be checked for how many signature pairs the vertical disparity is below threshold values $S_1$, $S_2$, $S_3$ and $S_4$, wherein: $S_1 \leq S_2 \leq S_3 \leq S_4$. This then results in four lists of in each case accepted signature pair assignments (accepted correspondences) and rejected signature pair assignments (rejected correspondences). It is then examined how the number of accepted correspondences bound in each case depends on the threshold value. The lowest threshold value is used at which the correspondence number value remains approximately the same. This results in a heuristic procedure for filtering the signature pairs so that "false" signature pairs that do not belong to the same object are rejected with good probability.

As soon as, as a result of the filtering, a number of selected signature pairs is smaller than a predetermined limit value, for example smaller than one tenth of the signatures originally assigned in pairs or absolutely smaller than five thousand signature pairs, for example, a triangulation calculation for determining depth data for the respective scene objects 59 to 61 takes place in a step 69. In addition to the number of selected signature pairs, a default tolerance value for the sum of squares of characteristic position deviations of the associated signature pairs, for example of the vertical disparity VD, can also serve as a termination criterion, in accordance with what has been explained above. A standard deviation of the characteristic position deviation, for example of the vertical disparity VD, can also be used as a termination criterion.

Triangulation in each case can be performed with the accepted signature pairs, i.e. the accepted correspondences.

As a result of this triangulation calculation, a 3D data map of the captured scene objects 59 to 61 within the captured image of the three-dimensional scene can be created and output as a result in a creation and output step 70. An example of such a 3D data map is an assignment of all points of the respective scene object to respective value triples $x_i$, $y_i$, $z_i$, which represent the position of this respective scene point in Cartesian coordinates. A three-dimensional reproduction of the respective scene object is possible via a corresponding access to this 3D data map.

If the filtering step 68 shows that the number of selected signature pairs is still greater than the specified limit value, a determination step 71 first determines angular correction values between the various selected assigned signature pairs to check whether imaged raw objects that belong to the various selected assigned signature pairs can be arranged in the correct position relative to one another within the three-dimensional scene. For this purpose, the angles described above in connection with FIG. 8 are used, wherein these angles are available corrected in real time due to the measurement monitoring via the measuring units 56, 57.

Based on a compensation calculation carried out in the determination step 71, the scene objects 60, 61, for example, can then be distinguished from each other in the images 62, 63 despite their identical signatures $60_M$, $61_S$, so that a correspondingly assigned signature pair can be discarded as a misassignment, so that the number of selected signature pairs is reduced accordingly.

After the angle correction has been performed, a comparison step 72 is carried out to compare the angular correction values determined for the signature pairs with a predefined correction value. If the angular values of the signature pairs as a result of the comparison step 72 deviate from each other more than the predefined correction value, the filter algorithm used in the filtering step 68 is adapted in an adaptation step 73 in such a manner that, after filtering with the adapted filter algorithm, a number of selected signature pairs results which is smaller than the number which resulted in the previous filtering step 68. This adjustment can be done by eliminating signature pairs that differ in their disparities by more than a predetermined limit value. Also, a comparison benchmark, from when the signatures of a potential signature pair are assessed to be the equal and thus assignable, can be set more critically in the adjustment 73.

This sequence of steps 73, 68, 71 and 72 is then carried out until it is found that the angular correction values of the remaining assigned signature pairs deviate from each other by no more than the specified correction value. The triangulation calculation is then carried out again in step 69, wherein the angular correction values of the selected signature pairs can be included, and the results obtained are generated and output, in particular in the form of a 3D data map.

Figure 11:
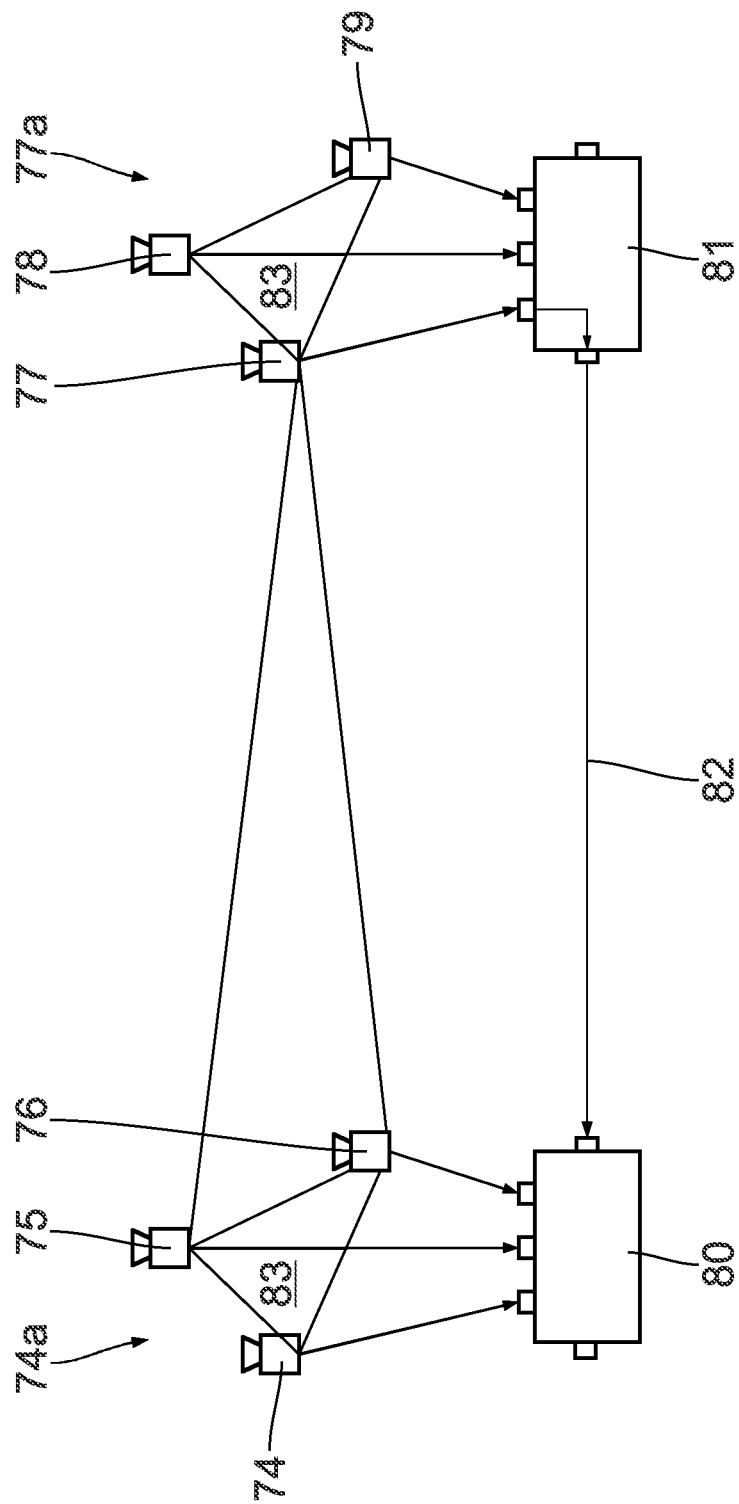
FIG. 11 shows an apparatus for carrying out a method for producing a redundant image of a measurement object using, for example, two groups of three cameras each that are assigned to a common signal processing.

FIG. 11 illustrates a method for producing a redundant image of a measurement object. For this purpose, a plurality of cameras are linked together whose entrance pupil centers define a camera arrangement plane. FIG. 11 shows two groups of three cameras 74 to 76 each, on the one hand (group 74a), and 77, 78, 79, on the other hand (group 77a). The groups 74a on the one hand and 77a on the other hand each have an associated data processing unit 80, 81 for processing and evaluating the image data acquired by the associated cameras. The two data processing units 80, 81 are in signal connection with each other via a signal line 82.

To capture a three-dimensional scene, for example, the cameras 74 to 76 of the group 74a can be interconnected so that, for example, a 3D capture of this three-dimensional scene is made possible via an image capture method explained above in connection with FIGS. 8 to 10. To produce an additional redundancy of this three-dimensional image capture, the image capture result of, for example, the camera 77 of the further group 77a can be used, which is provided to the data processing unit 80 of the group 74a via the data processing unit 81 of the group 77a and the signal line 82. Due to the spatial distance of the camera 77 to the cameras 74 to 76 of the group 74a, there is a significantly different viewing angle when imaging the three-dimensional scene, which improves the redundancy of the three-dimensional image capture.

A camera arrangement plane 83 that is defined by the cameras 74 to 76 of group 74a or the cameras 77 to 79 of group 77a is schematically indicated in FIG. 11 and is located at an angle to the drawing plane of FIG. 11.

Three-dimensional image capture using the cameras of exactly one group 74a, 77a is also referred to as intra-image capture. A three-dimensional image capture involving the cameras of at least two groups is also called inter-image capture.

Triangulation can be performed, for example, with the stereo arrangements of the cameras 78, 79, the cameras 79, 77 and the cameras 77, 78 independently in each case. The triangulation points of these three arrangements must coincide in each case.

A camera group in the manner of groups 74a, 77a can be arranged in the form of a triangle, in particular in the form of an isosceles triangle. An arrangement of six cameras in the form of a hexagon is also possible.

Compared to the distance between the cameras of one group 74a, 77a, the cameras of the other group are at least a factor of 2 further away. A distance between the cameras 76 and 77 is therefore at least twice the distance between the cameras 75 and 76 or the cameras 74 and 76. This distance factor can also be greater and can, for example, be greater than 3, can be greater than 4, can be greater than 5 and can also be greater than 10. A camera close range covered by the respective group 74a, 77a can, for example, be in the range between 80 cm and 2.5 m. By adding at least one camera of the respective other group, a far range can also be captured by the image capture apparatus beyond the near range limit.

In the following, a method for capturing three-dimensional images is described, which is to be understood as a supplement to the above description.

For three-dimensional image capture, a system of equations is solved for image point correspondences of known image points $(u,v)_{links}$ with $(u,v)_{right}$ for example of cameras 54, 55 with known focal length f. This system of equations reads:

$$\lambda_l \begin{bmatrix} u_l \\ v_l \\ f_l \end{bmatrix} = \begin{bmatrix} t_x \\ t_y \\ t_z \end{bmatrix} + \lambda_r \begin{bmatrix} R_{xx} & R_{xy} & R_{xz} \\ R_{yx} & R_{yy} & R_{yz} \\ R_{zx} & R_{zy} & R_{zz} \end{bmatrix} \begin{bmatrix} u_r \\ v_r \\ f_r \end{bmatrix} \quad \text{(Eq. 1)}$$

Figure 12:
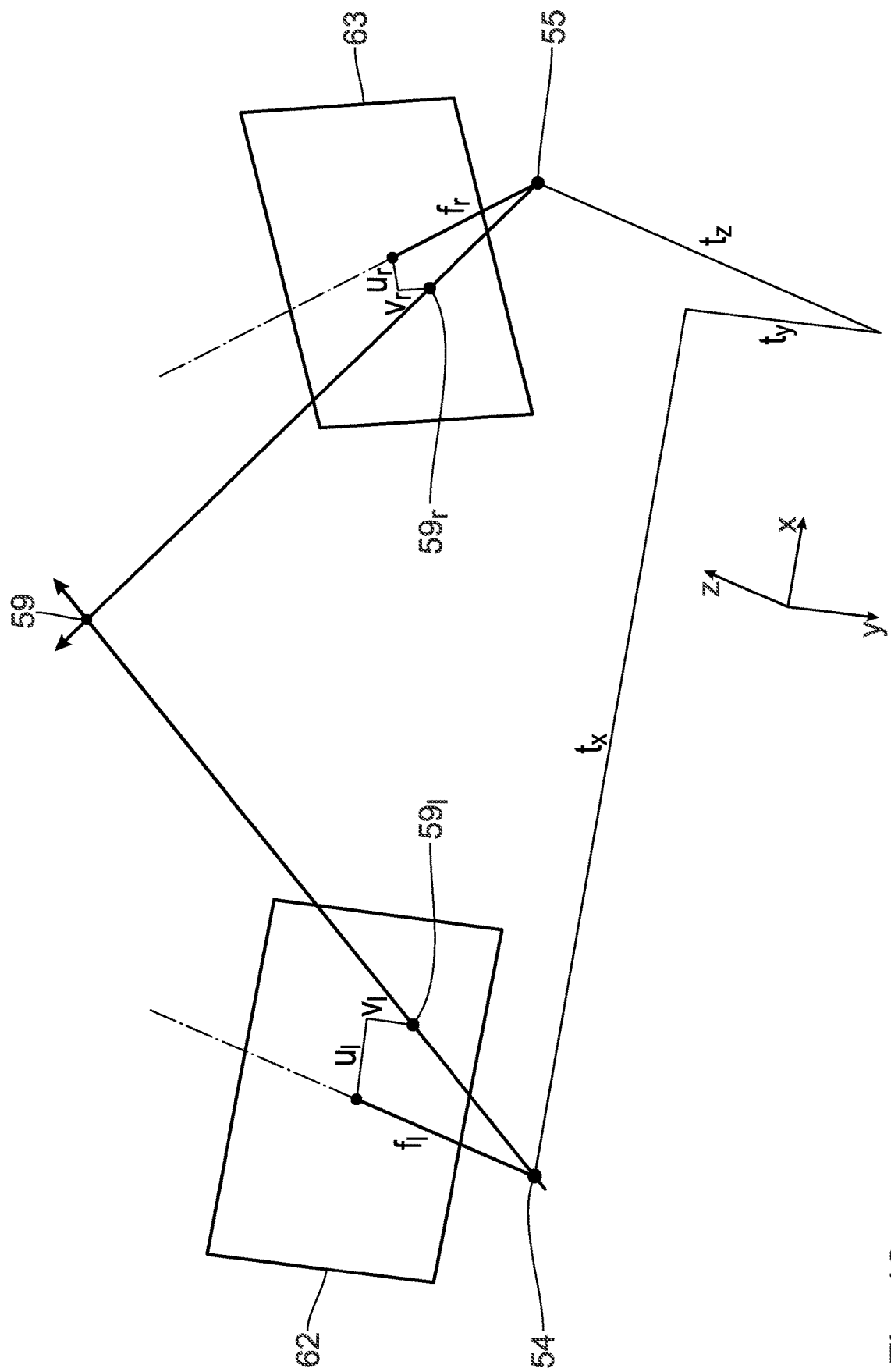
FIG. 12 in a representation similar to FIG. 8, again shows two cameras of a stereo camera for capturing three-dimensional images, wherein coordinates and position parameters for determining correction values, in particular angular correction values of the cameras to each other are illustrated.

This equation 1 is explained in more detail below with reference to FIG. 12.

In equation 1:

$u_l$, $v_l$: mean image coordinates of a scene feature under consideration, using the example of scene object 59, $59_l (=59_M)$ in the left image;

$u_r$, $v_r$: mean image coordinates of the feature, using the example of scene object 59, $59_r (=59_S)$ in the right image;

$f_l$, $f_r$: mean focal lengths of the left and right cameras 54, 55;

$\lambda_l$, $\lambda_r$: mean running variables along the ray from the center of the left or right camera 54, 55 through the image point of the left or right camera. At $\lambda=0$ the center of the left and right camera 54, 55 respectively, at $\lambda=1$ the point $59_l$, $59_r$ of the scene object 59 is on the respective image 62, 63 of the respective camera 54, 55. At $\lambda>1$ points are further on the ray in front of the left and right camera 54, 55 respectively to the respective image plane 62, 63 up to the intersection point in the scene object 59 and beyond;

$t_x$, $t_y$, $t_z$: mean coordinates of the position of the center of the right camera 55 in the coordinate system of the left camera 54. The length of this vector $\vec{t}$ is the base length (blen) or baseline 58 (cf. FIG. 8). This length of the vector $\vec{t}$ can be measured and/or is known from the mounting situation of the two cameras 54, 55. After the length of $\vec{t}$ is known, two degrees of freedom remain with the three coordinates $t_x$, $t_y$ and $t_z$;

$R_{xx}, \ldots, R_{zz}$: mean parameters of the rotation matrix to describe the rotational position of the right camera 55 in the coordinate system of the left camera 54. This rotation has three degrees of rotational freedom.

The optical axes of the two cameras 54, 55 are shown in dash-dotted lines in FIG. 12, again comparable to FIG. 9.

Equation 1 above can be written as three equations 1.1, 1.2 and 1.3 for the value triple $u_l$ (equation 1.1), $v_l$ (equation 1.2) and $f_1$ (equation 1.3). It is therefore a system of equations comprising three equations (Eq.1.1 to Eq.1.3) and two unknowns ($\lambda_l$, $k_r$). These equations can be transformed into one equation while eliminating the unknowns ($\lambda_l$, $\lambda_r$).

A correspondence is an accordance of feature points when the same scene object is captured by the different cameras 54, 55 (left l, right r) of the image capture apparatus. If a feature point of a scene object has been captured by camera 54 at image coordinates ui, vi and the same feature point is captured by camera 55 at image coordinates uj, vj, this is a (positive) correspondence. Each correspondence can be assigned a vertical disparity VD. Therefore, at least five correspondences per camera pair are necessary, the number may be somewhat higher, but advantageously significantly higher, for the sake of higher statistical stability.

The image point correspondences can be stereo correspondences. For stereo correspondence, reference is made to the technical articles Daniel Scharstein, Richard Szeliski: A taxonomy and evaluation of dense two-frame stereo correspondence algorithms, in: International journal of computer vision, 47th ed, no. 1-3, 2002, pp. 7-42 and Alex Kendall et al: End-to-end learning of geometry and context for deep stereo regression. CoRR, vol. abs/1703.04309, 2017.

In EQ 1, u, v are Cartesian coordinates of the respective image point, for example the respective Cartesian coordinates x, y or coordinates in the direction of the respective horizontal and vertical disparity HD, VD.

The vectors (u,v,f) describe a point on the ray from the origin of a camera 54, 55 with running parameter $\lambda$.

Eq. 1 describes the change in position from the right camera (for example camera 55) to the left camera (for example camera 54) with three position parameters via the translation vector $\vec{t}$ and the rotation matrix R, i.e. with six degrees of freedom.

Since the length (base length=baseline 58 of FIG. 8=blen) of the displacement vector t cannot be estimated without scalar knowledge in the three-dimensional scene, but is measured or otherwise known in advance, there are 5 degrees of freedom, namely two displacements normalized with blen, perpendicular to blen (which can also be interpreted as rotations of the blen), and three rotations of the right camera to the left (thus 5 rotations).

An example of the 5 degrees of freedom are the aforementioned angles $by_s$, $bz_s$, $ax_s$, $ay_s$, $az_s$ for the positional relationship of the slave camera 55 to the master camera 54.

The system of equations GL 1 consists of three equations with two unknowns, namely the two running parameters $\lambda_l$, $\lambda_r$ and five degrees of freedom of the translation matrix T and the rotation matrix R.

From these three equations, an equation can be formed in which there is no longer an unknown variable. Suitable transformations thus produce exactly one equation without the $\lambda$ parameters, i.e. only dependent on the 5 degrees of freedom.

With at least five equations, the degrees of freedom can be calculated by an estimator, for example. Such an estimator solves the usually overdetermined system of equations by minimizing a residual error. Such an estimator is known in the literature as the "James Stein estimator" (cf. the paper "Stein's estimation rule and its competitors—an empirical bayes approach" by B. Efron and C. Morris, Journal of the American Statistical Association 68 (341, pages 117 to 130, 1973).

The correspondences, i.e. the image point correspondences according to equation 1 above, must be linearly independent of each other.

With a high number of correspondences, false positives can be filtered out by algorithms that are based on the weighting of the features regarding the size of their distance to the respective epipolar line of the respective camera 54, 55.

The false positive correspondences are normally distributed in a first approximation. The true positive correspondences have characteristic accumulations, i.e. they are not normally distributed. The filtering results in the false positive correspondences being filtered out, so that the positive correspondences remain within the framework of a convergent algorithm. The positives allow the estimator to converge to the ACTUAL value. This estimator also works for squint cameras (directional deviation between zm and zs, cf. in particular the description above for FIG. 8) and converges faster for fisheye cameras.

If the image capture apparatus comprises two cameras 54, 55, five degrees of freedom must be determined. If there are three cameras that can be configured into two camera pairs, there are ten degrees of freedom to be determined.

Generally, n cameras are provided in an image capture apparatus. In one camera pair, 5 degrees of freedom can be estimated. Each camera beyond a first camera pair with five degrees of freedom contributes six additional degrees of freedom. With n cameras, this results in 6n−1 estimable degrees of freedom.

IMU (inertial sensors for rotation rate) are built into both cameras 54, 55 of the image capture apparatus. From the rotation rate in one period (mono-period frame), the rotational position deviation can be estimated and thus the five rotational position deviations of the cameras to each other. The residual error is compensated by the application of the method. When using IMUs, an IMU translation can also be used. When using IMUs, acceleration values can be acquired, which helps to improve prediction accuracy.

The prediction by the IMU data can also be integrated over several cycles for stabilization. For this purpose, the method is also calculated over these periods.

The number of cameras can also be increased to three and more, instead of two, cameras for joint calculation. The different perspectives improve the estimation results even if the cameras are in a row.

The estimation is improved again when the cameras span an area.

The estimation is improved again if the cameras are more squinty and thus together open up a larger field of view. In this sense, a fisheye can be a better camera 54, 55 than a normal lens.

Each of the scene objects can be a larger corresponding image area (blob), for example a component of a vehicle. The correspondences of larger blobs can be determined more accurately than the correspondences of smaller features.

With three cameras, the same three-dimensional feature can be found in three images. If it is found three times, it is plausibilized. A corresponding plausibility check can be included in the position deviation filtering of the image capture method. If a particular feature is captured by two cameras, its position can be predicted when captured by the third camera. If it is actually imaged upon imaging by the third camera, the three-dimensional feature in question is then plausibilized. If not, a misassignment is assumed.

With an increasing number of cameras, the plausibility increases and thus the mentioned rejections of false-positive correspondences.

Each estimation weights the correspondences via the weights of the distances to the epipolar line of the respective camera 54, 55. Before each estimation step, the respective epipolar line is calculated. In case of multiple estimation, the epipolar line changes and the weights are changed as well. Up to a threshold value, for example, the weight "1" can be assumed. Up to a double threshold value, the weight can then be reduced linearly to zero.

The change in the weights in the course of the multiple estimation in turn provides information about the possibility of a false positive, which in turn leads to new weightings. The value of the respective weights can be guided by comparing the correspondence numbers when using the four differently sized threshold values $S_1$ to $S_4$.

The weightings are described via a cost function depending on, for example, the amount of the threshold values.

The correspondences should be distributed as evenly as possible in the image. For this purpose, the image is divided into zones (for example, nine evenly distributed zones). The number of features in the zones should ideally be even. A ZDF (Zone Distribution Function) describes the distribution of the features in the image. If the distribution is unfavorable, the estimation is rejected.

An estimator is more robust with regard to the result obtained if there are evenly distributed correspondences over the respective image. When subdividing zones, it can be ensured that a minimum number of correspondences is present in all zones. At least for a last estimation performed, such a minimum number of correspondences must be present in the zones. Correspondences from zones in which many correspondences are present compared to, for example, a mean value of the correspondences in the subdivided zones, can then be weighted less by smaller weight factors.

Unevenly distributed correspondences can also be better evenly distributed by deleting them in overpopulated zones as an alternative to the reweighting described above.

Unevenly distributed correspondences can be discriminated by weighting in overpopulated zones.

The ZDF distribution can also be adjusted via the weights from the proximity to the epipolar lines. This follows by a product, on the one hand, of a weight that depends on the proximity of the respective epipolar line and, on the other hand, of a weight that depends on the respective zone.

The correspondences are weighted by their distances to the current epipolar line. In principle, a large number of correspondences, i.e. also larger distances to the respective epipolar line, can be considered. However, the number of correspondences having small distances to the respective epipolar line should be comparatively large. For this purpose, the curve of the number of correspondences is considered via increasing maximum epipolar distances. This typically s-shaped curve (first slightly increasing, then strongly increasing, then weakly increasing again), which indicates the number of correspondences as a function of the epipolar distance, is analyzed and the location of the largest gradient is sought (inflection point). For small changes in small distances, rejected correspondences increase statistically almost linearly. Beyond an actual error, this increase remains nominally constant.

This location is a compromise between as much correspondences as possible and not too much correspondences having a large distance.

Near an actual value, the correspondences accumulate, i.e. the significance increases. Far away from an actual value, the correspondences are usually statistically distributed (background noise).

The results of the estimation can be averaged over a time period. Thus, several images can be recorded in a sequence and subjected to a corresponding estimation. This results in a temporal filtering.

The averaged estimated values are only averaged up to a maximum past. Thus, a moving average is calculated in real time. Disturbances that are correspondingly long in the past are forgotten again and no longer hinder the latest estimations.

The relative positions of the cameras used in the image capture apparatus can be estimated with the image capture method. Estimation results of different image capture scenarios can be compared. If they differ too much from each other, they are rejected and deactivated (fail-safe) or one of the two results is confirmed by a third one and the mission is continued (fail-operational). The measurements with these recalibrated cameras are also confirmed in this case with two matches within three measurements.

An extrinsic calibration with the image capture method is based on an intrinsic calibration (distortion, focal length, etc.) of the respective camera.

The model errors of the intrinsic calibration can be integrated into the weightings of the distances to the epipolar lines. A prediction of coordinates of scene objects 59 to 61 in the image of the second camera 55, depending on the epipolar line distances, i.e. the epipolar curve, can be made directly considering a distortion description. The weights of such a description can be increased according to an expected residual error of a distortion correction.

To capture the all-round view with as few cameras as possible, the cameras can be equipped with fisheye lenses having a focal length smaller than 20 mm, in particular smaller than 10 mm. At greater distances, the distance resolution will be lower due to the small focal length than when using normal or telephoto lenses. Estimation with normal or telephoto lenses is more unstable than estimation with fisheye lenses. If telephoto cameras with a focal length of at least 80 mm, which may in particular be at least 150 mm or at least 200 mm, are mounted or assigned to fisheye cameras in a form-stable manner for optimizing the above-described cameras 54, 55, 74-76, 77-79, the estimation of the fisheye camera may be transformed into the telephoto camera. If two fisheye cameras are estimated, new estimations automatically result for the telephoto cameras associated with them. However, the higher resolution of the telephoto cameras can provide contributions to the estimation of the system of at least two fisheye cameras and the associated telephoto cameras. The image capture apparatus then no longer has only fisheye cameras but also additional associated telephoto cameras. For example, two fisheye cameras may form a stereo pair (cf. the example of cameras 54. 55 above). Each fisheye camera can have a telephoto camera permanently or rigidly assigned to it. From the correspondences of the fisheye cameras, on the one hand, and the correspondences of the telephoto cameras, on the other hand, an enlarged system of equations can be constructed according to equation 1 above, which is then solved.

The estimated values can be averaged via a plurality of frames. Averaging can be done with IMU value-normalized estimated values. Larger movements are less disturbing.

The averaging of the IMU value-normalized estimations can be smoothed and thus stabilized by rejecting IMU-detected jerk movements.

A motion model can support an estimation. A prediction of the angles with their probability can be balanced with the current measurement and the measurement errors and dynamic measurements can be supported. The motion model is based on the stiffness assumption of a supporting structure or the supporting frame of the cameras. The movement must be slower than the exposure time, but can be faster than the cycle time, i.e. the image refresh time.

The typical movements of a superstructure can be recorded and AI (artificial intelligence) models can be derived from this training set, which allow for better prediction. For example, motor vibrations that are introduced into the supporting structure for the cameras can be compensated.

The AI model can detect jerk-like movements and help reject estimations.

The estimation of the relative position of the cameras can be asynchronous with the measurement using triangulation. The measurement is based on classical stereo algorithms of rectified images.

The image capture method uses native features to form correspondences.

A classical stereo matching method compares grey value differences and searches for a location along the epipolar curve, typically a horizontal line, with the smallest grey value difference, which must fall below a threshold. A signature exists if the grey values are equal. "Native" features are converted from a transformation of grey values of a feature environment into a signature. Thus, a comparison of grey values within a feature environment takes place in a camera image. Only features are used whose signatures occur comparatively rarely in the image, for example less than ten, less than eight or less than seven times. Such rare features are called native features.

The correspondences can also be used for distance measurement with triangulation. The features are extracted and used for triangulation (native stereo). The same features are used in the context of the image capture method and for estimation. Once the estimation is done, the new results can be added to the measurements asynchronously. Measurements are made several times, while estimation is made only once. This is done with slowly changing relative positions of the cameras.

The image capture method can quickly detect strong deviations in coarser (binned) images, i.e. images in which a plurality of pixels are grouped together in each case. If these are detected, the exact changes are determined in the finer images and made available to the measurements. Estimations with smaller deviations are not provided because the computationally intensive calculation of the warp parameters for rectified images is to be avoided. Warp parameters are parameters for describing a desired rectification based on a distortion description, i.e. based on an image error description of the cameras 54, 55.

The rejected deviations must of course be smaller than the deviations that can be tolerated by DenseStereo, i.e. by the classic stereo matching method described above. Line errors of one pixel can usually be tolerated. This depends on a size of a compared environment. However, such line errors, even if they are small, lead to errors in the distance measurement.

In the case of highly deformable (soft) mechanical constructions between the respective cameras under consideration, for example cameras 54, 55, an estimation must be made before each measurement. The warp parameters are calculated from the estimation data, then the rectified images are calculated with the aim of line fidelity and the distance is determined via triangulation from the DenseStereo correspondence, i.e. a location of minimum distance.

The calculations of the warp parameters for DenseStereo are computationally intensive. Native stereo, i.e. an assignment of native features without line fidelity and without comparison of grey values, where only a comparison of signatures takes place, can calculate the triangulation directly from the correspondences of the image capture method.

The image capture method also provides a confidence measure for the correspondences via the weighting of the distances to the epipolar lines. The confidence measure is, on the one hand, a probability of a correspondence via more than two cameras and, on the other hand, an evaluation of the magnitude of an expected noise, ultimately a signal/noise ratio.

The synchronous sequence of estimation and triangulation with native features is thus efficient and gives a measure of the trustworthiness of measurement points.

Native triangulation can measure distance from a correspondence. Here, a center of a distance of skewed rays that are generated from two corresponding image points of the two stereo cameras 54, 55 is considered. Such a distance must fall below a predetermined threshold.

However, if three or more cameras are used, there can be three or more correspondences per feature. The distance measurement becomes more accurate and reliable. However, the number of measurement points usually decreases. An intersection of successful triangulations between a camera pair ½ and a camera pair ⅔ is smaller than a union of the two successful triangulations.

If a plurality of identical signatures are found in camera pairs, multiple correspondences are created. From these correspondences of identical signatures, those with the lowest cost functions to the epipolar lines are selected. Thus, the signature that is closest to an epipolar curve is selected and not necessarily the signature that is closest in space.

A plurality may be selected, but each selected signature may only be used once. Once a correspondence has been selected, the two positions in both images should not be used for further correspondences.

The invention claimed is:

1. A method for capturing three-dimensional images with the aid of a stereo camera (55*a*) having two cameras (54, 55), comprising the following steps:
    capturing (64) an image (62, 63) of a three-dimensional scene simultaneously with the two cameras (54, 55) of the stereo camera (55*a*),
    determining (65) characteristic signatures of scene objects (59 to 61) within each captured image (62, 63), assigning (66) the signatures of the captured images (62, 63) in pairs to each other, determining (67) characteristic position deviations (HD, VD) of the assigned signature pairs from one another, filtering (68) the position deviations to select subsets of the assigned signature pairs as selected signature pairs, triangulation calculation (69) to determine depth data for the respective scene objects (59 to 61) on the basis of the selected signature pairs, creating (70) a 3D data map of the captured scene objects (59 to 61) within the captured image of the three-dimensional scene, wherein, as long as a number of selected signature pairs is greater than a predetermined limit value, the following steps are carried out:

determining (71) angular correction values between different selected assigned signature pairs to check whether mapped raw objects (59 to 61) that belong to the different selected assigned signature pairs can be positioned correctly within the three-dimensional scene, comparing (72) each of the angular correction values determined for the signature pairs with a predetermined correction value, creating (70) a 3D data map of the captured scene objects (59 to 61) within the captured image of the three-dimensional scene.

2. The method according to claim 1, wherein filtering (68) the position deviations selects the subsets of the assigned signature pairs that belong to same ones of the scene objects of the three-dimensional scene with a filtering algorithm.

3. The method according to claim 1, wherein the triangulation calculation (69) is performed as soon as a number of selected signature pairs is smaller than a predetermined limit value.

4. The method according to claim 1, wherein, as long as the number of selected signature pairs is greater than a predetermined limit value, the following steps are carried out:

insofar as the angular correction values of the signature pairs deviate from each other by more than a specified correction value:

adjusting (73) a filtering algorithm so that after filtering (68) with the adjusted filtering algorithm a number of selected signature pairs is obtained which is smaller than the number obtained in the previous filtering step, and repeating the comparison (72), insofar as the angular correction values of the signature pairs deviate from each other by at most the specified correction value:

triangulation calculation (69) to determine depth data for the respective scene objects (59 to 61), creating (70) a 3D data map of the captured scene objects (59 to 61) within the captured image of the three-dimensional scene.

5. The method according to claim 1, wherein the triangulation calculation (69) includes the angular correction values of the selected signature pairs.

6. The method according to claim 1, wherein during the capturing (64) of the images (62, 63), data are simultaneously acquired from inertial measuring units (56, 57) to which the cameras (54, 55) are fixedly connected.

* * * * *